United States Patent
Guo

(10) Patent No.: US 12,020,150 B2
(45) Date of Patent: Jun. 25, 2024

(54) OPTICAL NEURAL NETWORK

(71) Applicant: Oxford University Innovation Limited, Oxford (GB)

(72) Inventor: Xianxin Guo, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 793 days.

(21) Appl. No.: 17/114,640

(22) Filed: Dec. 8, 2020

(65) Prior Publication Data
US 2022/0180175 A1 Jun. 9, 2022

(51) Int. Cl.
*G06N 3/08* (2023.01)
*G06N 3/067* (2006.01)

(52) U.S. Cl.
CPC ............ *G06N 3/08* (2013.01); *G06N 3/067* (2013.01)

(58) Field of Classification Search
CPC ........................................................ G06N 3/08
USPC .......................................................... 706/38
See application file for complete search history.

(56) References Cited

U.S. PATENT DOCUMENTS

| | | | | |
|---|---|---|---|---|
| 5,095,459 A * | 3/1992 | Ohta | ........................ | G06V 10/88 |
| | | | | 708/801 |
| 6,483,629 B1 * | 11/2002 | Boffi | ........................ | H01S 3/0057 |
| | | | | 359/341.1 |
| 2008/0291951 A1 * | 11/2008 | Konttinen | ............ | H04N 9/3164 |
| | | | | 372/21 |
| 2017/0351293 A1 * | 12/2017 | Carolan | .................. | G02F 3/024 |
| 2019/0147342 A1 * | 5/2019 | Goulding | ............... | G06N 3/044 |
| | | | | 706/25 |

(Continued)

FOREIGN PATENT DOCUMENTS

| | | | | |
|---|---|---|---|---|
| WO | WO-2017201506 A1 | * | 11/2017 | ............. G06N 3/044 |
| WO | WO-2019186548 A1 | * | 10/2019 | ............. G02F 1/353 |

OTHER PUBLICATIONS

A. A. Cruz-Cabrera, M. Yang, G. Cui, E. C. Behrman, J. E. Steck, and S. R. Skinner, "Reinforcement and backpropagation training for an optical neural network using self-lensing effects," IEEE Trans. Neural Netw. 11, 1450-1457 (Year: 2000).*

(Continued)

*Primary Examiner* — Reza Nabi
(74) *Attorney, Agent, or Firm* — Thomas|Horstemeyer, LLP

(57) ABSTRACT

An optical neural network having at least one layer including: an optical transmission element arranged such that the signal of each node passes through the optical transmission element in both forward and backpropagation; wherein the optical transmission element comprises a saturable optical absorption material or a saturable optical gain material, having a saturation threshold-power; wherein optical signals propagating in a forward direction have a power below the saturation threshold-power at least some of the time, such that transmission of the optical signal through the optical transmission element in a forward direction is nonlinear; and wherein optical signals propagating in a backward direction have a power below a second threshold-power, lower than the saturation threshold-power, and transmission of the optical signal in a backward direction through the optical transmission element is approximately linear.

17 Claims, 9 Drawing Sheets
(6 of 9 Drawing Sheet(s) Filed in Color)

(56) References Cited

U.S. PATENT DOCUMENTS

| | | | | |
|---|---|---|---|---|
| 2019/0188572 | A1* | 6/2019 | Lanctot | G06N 3/084 |
| 2019/0258936 | A1* | 8/2019 | Shamir | G06N 5/01 |
| 2019/0325313 | A1* | 10/2019 | Shamir | G06N 3/082 |
| 2020/0151572 | A1* | 5/2020 | Gurumurthi | G06N 3/084 |
| 2020/0372334 | A1* | 11/2020 | Carolan | G06N 3/088 |
| 2022/0180175 | A1* | 6/2022 | Guo | G06N 3/0675 |

OTHER PUBLICATIONS

E. Cambria and B. White, Jumping nlp curves: A review of natural language processing research, IEEE Comput. Intell. Mag. 9, 48 (2014).

W. Rawat and Z. Wang, Deep convolutional neural networks for image classilcation: A comprehensive review, Neural Comput. 29, 2352 (2017).

D. Silver, A. Huang, C. J. Maddison, A. Guez, L. Sifre, G. Van Den Driessche, J. Schrittwieser, I. Antonoglou, V. Panneershelvam, M. Lanctot, et al., Mastering the game of go with deep neural networks and tree search, Nature 629, 484 (2016).

J. Gilmer, S. S. Schoenholz, P. F. Riley, O. Vinyals, and G. E. Dahl, Neural message passing for quantum chemistry, in Proceedings of the 34th International Conference on Machine Learning—vol. 70 (JMLR. org, 2017) pp. 1263-1272.

G. Torlai, G. Mazzola, J. Carrasquilla, M. Troyer, R. Melko, and G. Carleo, Neural-network quantum state tomography, Nat. Physics 14, 447 (2018).

K. Hornik, M. Stinchcombe, and H. White, Multilayer feedforward networks are universal approximators, Neural Netw. 2, 359 (1989).

G. Cybenko, Approximation by superpositions of a sigmoidal function, Math. Control Signals Syst. 2, 303 (1989).

P. N. Tamura and J. C. Wyant, Two-dimensional matrix multiplication using coherent optical techniques, Opt. Eng. 18, 182198 (1979).

Y. Shen, N. C. Harris, S. Skirlo, M. Prabhu, T. Baehr-Jones, M. Hochberg, X. Sun, S. Zhao, H. Larochelle, D. Englund, et al., Deep learning with coherent nanophotonic circuits, Nat. Photonics 11, 441 (2017).

L. De Marinis, M. Cococcioni, P. Castoldi, and N. Andriolli, Photonic neural networks: A survey, IEEE Access 7, 175827 (2019).

S. Jutamulia and F. Yu, Overview of hybrid optical neural networks, Opt. Laser Technol. 28, 59 (1996).

J. Bueno, S. Maktoobi, L. Froehly, I. Fischer, M. Jacquot, L. Larger, and D. Brunner, Reinforcement learning in a large-scale photonic recurrent neural network, Optica 5, 756 (2018).

X. Lin, Y. Rivenson, N. T. Yardimci, M. Veli, Y. Luo, M. Jarrahi, and A. Ozcan, All-optical machine learning using diffractive deep neural networks, Science 361, 1004 (2018).

Y. Zuo, B. Li, Y. Zhao, Y. Jiang, Y.-C. Chen, P. Chen, G.-B. Jo, J. Liu, and S. Du, All-optical neural network with nonlinear activation functions, Optica 6, 1132 (2019).

Y. LeCun, Y. Bengio, and G. Hinton, Deep learning, Nature 521, 436 EP (2015).

T. W. Hughes, M. Minkov, Y. Shi, and S. Fan, Training of photonic neural networks through in situ backpropagation and gradient measurement, Optica 5, 864 (2018).

I. A. D. Williamson, T. W. Hughes, M. Minkov, B. Bartlett, S. Pai, and S. Fan, Reprogrammable electrooptic nonlinear activation functions for optical neural networks, IEEE J. Sel. Top. Quantum Electron. 26, 1 (2020).

Z. Cheng, H. K. Tsang, X. Wang, K. Xu, and J.-B. Xu, In-plane optical absorption and free carrier absorption in graphene-on-silicon waveguides, IEEE J. Sel. Top. Quantum Electron. 20, 43 (2013).

K. Wagner and D. Psaltis, Multilayer optical learning networks, Appl. Opt. 26, 5061 (1987).

D. Psaltis, D. Brady, and K. Wagner, Adaptive optical networks using photorefractive crystals, Appl. Opt. 27, 1752 (1988).

A. A. Cruz-Cabrera, M. Yang, G. Cui, E. C. Behrman, J. E. Steck, and S. R. Skinner, Reinforcement and backpropagation training for an optical neural network using self-lensing effects, IEEE Trans. Neural Netw. 11, 1450 (2000).

W. Yang, D. B. Conkey, B. Wu, D. Yin, A. R. Hawkins, and H. Schmidt, Atomic spectroscopy on a chip, Nat. Photonics 1, 331 (2007).

R. Ritter, N. Gruhler, W. Pernice, H. Kubler, T. Pfau, and R. Low, Atomic vapor spectroscopy in integrated photonic structures, Appl. Phys. Lett. 107, 041101 (2015).

Q. Bao, H. Zhang, Y.Wang, Z. Ni, Y. Yan, Z. X. Shen, K. P. Loh, and D. Y. Tang, Atomic-layer graphene as a saturable absorber for ultrafast pulsed lasers, Adv. Funct. Mater. 19, 3077 (2009).

Y. LeCun, L. Bottou, Y. Bengio, P. Haffer, et al., Gradient-based learning applied to document recognition, Proc. IEEE 86, 2278 (1998).

G. Cohen, S. Afshar, J. Tapson, and A. van Schaik, Emnist: an extension of mnist to handwritten letters, arXiv:1702.05373 (2017).

J. Chang, V. Sitzmann, X. Dun, W. Heidrich, and G. Wetzstein, Hybrid optical-electronic convolutional neural networks with optimized diffractive optics for image classification, Sci. Rep. 8, 12324 (2018).

H. Bagherian, S. Skirlo, Y. Shen, H. Meng, V. Ceperic, and M. Soljaci'c, On-chip optical convolutional neural networks, arXiv:1808.03303 (2018).

S. Xu, J. Wang, R. Wang, J. Chen, and W. Zou, Highaccuracy optical convolution unit architecture for convolutional neural networks by cascaded acousto-optical modulator arrays, Opt. Express 27, 19778 (2019).

R. Hamerly, L. Bernstein, A. Sludds, M. Soljaci'c, and D. Englund, Large-scale optical neural networks based on photoelectric multiplication. Phys. Rev. X 9, 021032 (2019).

Steven R. Skinner, Elizabeth C. Behrman, Alvaro A. Cruz-Cabrera, and James E. Steck, "Neural network implementation using self-lensing media", Jul. 10, 1995 @ vol. 34, No. 20 @ Applied Optics 4129-4135.

On-Chip Optical Convolutional Neural Networks Hengameh Bagherian et al., Massachusetts Institute of Technology, Department of Physics, Cambridge, MA 02139, USA, Research Laboratory of Electronics, Massachusetts Institute of Technology, Cambridge, MA 02139, USA, Faculty of Electrical Engineering and Computing, University of Zagreb, Unska 3, 10000 Zagreb, Croatia, Aug. 16, 2018.

Learning representations by back-propagating errors David E. Rumelhart et al., Institute for Cognitive Science, C-015, University of California, San Diego, La Jolla, California 92093, USA Department of Computer Science, Carnegie-Mellon University, Pittsburgh, Philadelphia 15213, USA, Nature vol. 323, Oct. 9, 1986.

Fully reconfigurable coherent optical vector-matrix multiplication James Spall et al., 5752 Vol. 45, No. 20 / Oct. 15, 2020 / Optics Letters Letter.

Optical implementation of the Hopfield model, Nabil H. Farhat et al., University of Pennsylvania, Moore School of Electrical Engineering, Philadelphia, Pennsylvania 19104; the other authors are with California Institute of Technology, Electrical Engineering Department, Pasadena, California 91125.

Optical neural network with pocket-sized liquid-crystal televisions Francis T. S. Yu, Taiwei Lu, and Xiangyang Yang Aug. 1, 1990 / vol. 15, No. 15 / Optics Letters.

Experimental Realization of Any Discrete Unitary Operator, Michael Reck et al., vol. 73, No. 1, Physical Review Letters, Jul. 4, 1994.

Efficient, compact and low loss thermo-optic phase shifter in silicon, Nicholas C. Harris et al., revised Apr. 12, 2014; accepted Apr. 13, 2014; published Apr. 23, 2014, 2014 OSA May 5, 2014 | vol. 22, No. 9 | DOI:10.1364/OE.22.010487 | Optics Express 10493.

Quantum transport simulations in a programmable nanophotonic processor, Nicholas C. Harris et al., Nature Photonics, Articles Published Online: Jun. 19, 2017 | DOI: 10.1038/NPHOTON.2017.95.

Pixelated phase computer holograms for the accurate encoding of scalar complex fields, Victor Arrizón et al., J. Opt. Soc. Am. A/vol. 24, No. 11/Nov. 2007.

(56) References Cited

OTHER PUBLICATIONS

Pursuing High Quality Phase-Only Liquid Crystal on Silicon (LCoS) Devices, Huang-Ming Philip Chen et al., Applied Sciences, Accepted: Nov. 14, 2018; Published: Nov. 21, 2018.
Daniel A. Steck, "Rubidium 87 D Line Data," available online at http://steck.us/alkalidata (revision 2.1.4, Dec. 23, 2010).

* cited by examiner

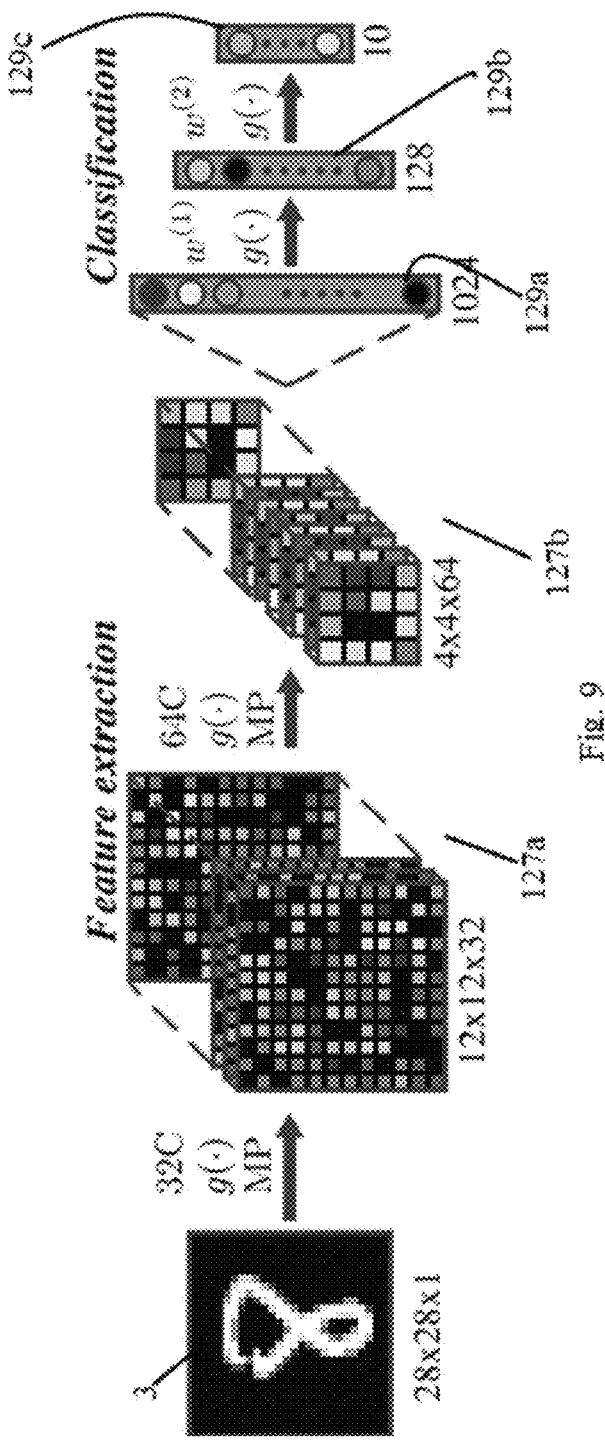

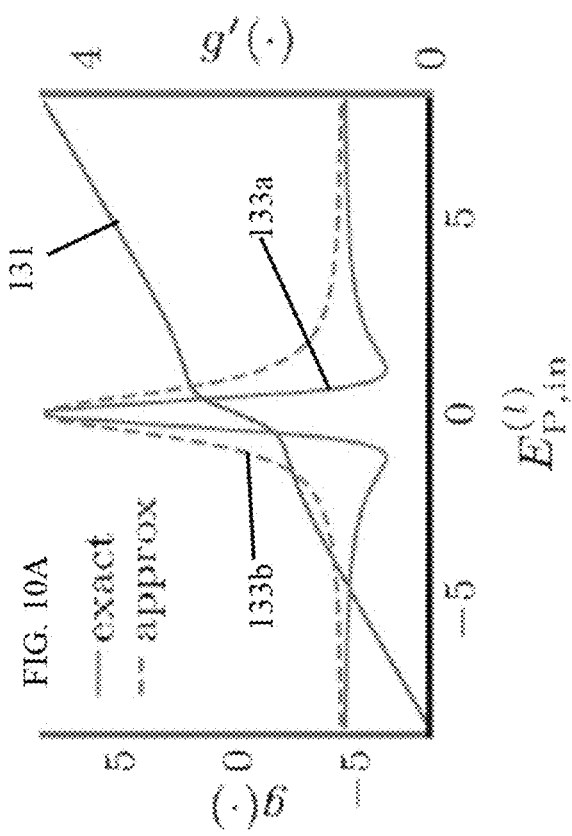
FIG. 10A
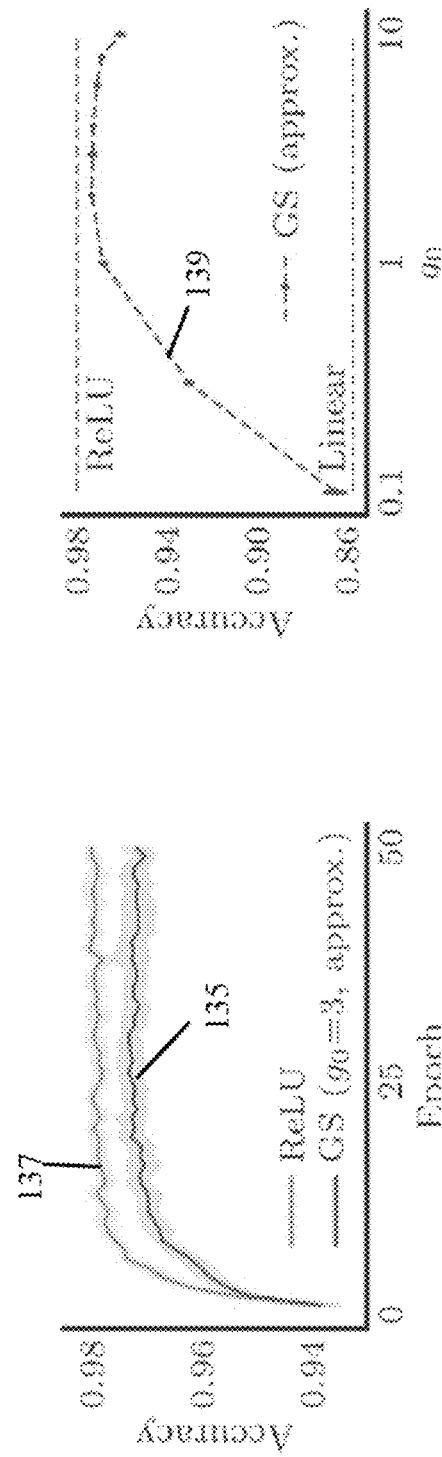
FIG. 10B
FIG. 10C

OPTICAL NEURAL NETWORK

The present disclosure relates to an optical neural network. In particular, but not exclusively, the present invention relates to an optical neural network in which an optical signal is backpropagated through the network for training.

Artificial neural networks (ANNs) are universal function approximators capable, in principle, of representing an arbitrary mapping of inputs to outputs, and are used in a wide range of complex tasks such: natural language processing; image recognition; artificial intelligence and other fundamental science. Use of ANNs in these applications and as universal function approximators is shown in the following prior art documents:

[1] E. Cambria and B. White, Jumping nlp curves: A review of natural language processing research, IEEE Comput. Intel. Mag. 9, 48 (2014).
[2] W. Rawat and Z. Wang, Deep convolutional neural networks for image classification: A comprehensive review, Neural Comput. 29, 2352 (2017).
[3] D. Silver, A. Huang, C. J. Maddison, A. Guez, L. Sifre, G. Van Den Driessche, J. Schrittwieser, I. Antonoglou, V. Panneershelvam, M. Lanctot, et al., Mastering the game of go with deep neural networks and tree search, Nature 529, 484 (2016).
[4] J. Gilmer, S. S. Schoenholz, P. F. Riley, O. Vinyals, and G. E. Dahl, Neural message passing for quantum chemistry, in Proceedings of the 34th International Conference on Machine Learning-Volume 70 (JMLR. org, 2017) pp. 1263-1272.
[5] G. Torlai, G. Mazzola, J. Carrasquilla, M. Troyer, R. Melko, and G. Carleo, Neural-network quantum state tomography, Nat. Physics 14, 447 (2018).
[6] K. Hornik, M. Stinchcombe, and H. White, Multilayer feedforward networks are universal approximators, Neural Netw. 2, 359 (1989).
[7] G. Cybenko, Approximation by superpositions of a sigmoidal function, Math. Control Signals Syst. 2, 303 (1989).

The function of an ANN relies heavily on two basic operations: matrix multiplication to communicate information between layers, and some nonlinear transformation of individual node states (activation functions). Matrix multiplication accounts for most of the computational cost associated with machine learning (ML) in an ANN.

ANNs can be trained to learn many approximate arbitrary functions. Typically, the training of an ANN is through the backpropagation algorithm, described in the following reference:

[8] D. E. Rumelhart, G. E. Hinton, and R. J. Williams, Nature 323, 533 (1986).

The backpropagation algorithm aims to minimise a loss function that quantifies the divergence of the ANN's current output or value from the ideal/expected output or value, via gradient descent. To do so, the following steps are repeated until convergence: (1) forward propagation of information through the network; (2) evaluation of the loss function gradients with respect to the network parameters at the output layer; (3) backpropagation of these gradients to all previous layers; (4) parameter updates in the direction that maximally reduces the loss function.

In an optical neural network (ONN), the matrix multiplication operation can be implemented by leveraging the coherence and superposition properties of linear optics, as discussed in the following prior art documents:

[9] P. N. Tamura and J. C. Wyant, Two-dimensional matrix multiplication using coherent optical techniques, Opt. Eng. 18, 182198 (1979).
[10] Y. Shen, N. C. Harris, S. Skirlo, M. Prabhu, T. Baehr-Jones, M. Hochberg, X. Sun, S. Zhao, H. Larochelle, D. Englund, et al., Deep learning with coherent nanophotonic circuits, Nat. Photonics 11, 441 (2017).
[11] L. De Marinis, M. Cococcioni, P. Castoldi, and N. Andriolli, Photonic neural networks: A survey, IEEE Access 7, 175827 (2019).

The following prior art document give examples for early proposals for ONNs which were realized as Hopfield networks:

[12] C. Denz, Optical neural networks, Springer Science and Business Media (2013).
[13] N. H. Farhat, D. Psaltis, A. Prata, and E. Paek, Optical implementation of the Hopfield model, Appl. Opt. 24, 1469 (1985).
[14] T. S. Francis, T. Lu, X. Yang, and D. A. Gregory, Optical neural network with pocket-sized liquid-crystal televisions, Opt. Lett. 15, 863 (1990).

Other proposals use self-lensing media or other techniques, such as shown in:

[15] S. R. Skinner, E. C. Behrman, A. A. Cruz-Cabrera, and J. E. Steck, Neural network implementation using self-lensing media, Appl. Opt. 34, 4129 (1995).
[16] Y. Abu-Mostafa and D. Psaltis, Optical neural computers, Sci. Am. 256, 88 (1987).
[17] S. Jutamulia and F. Yu, Overview of hybrid optical neural networks, Opt. Laser Technol. 28, 59 (1996).
[18] J. Bueno, S. Maktoobi, L. Froehly, I. Fischer, M. Jacquot, L. Larger, and D. Brunner, Reinforcement learning in a large-scale photonic recurrent neural network, Optica 5, 756 (2018).
[19] X. Lin, Y. Rivenson, N. T. Yardimci, M. Veli, Y. Luo, M. Jarrahi, and A. Ozcan, All-optical machine learning using diffractive deep neural networks, Science 361, 1004 (2018).
[20] Y. Zuo, B. Li, Y. Zhao, Y. Jiang, Y.-C. Chen, P. Chen, G.-B. Jo, J. Liu, and S. Du, All-optical neural net-work with nonlinear activation functions, Optica 6, 1132 (2019).

ONNs have been realized in both free space (for example [18] to [20] and in integrated circuits (for example [10]).

For ONNs, the nonlinearity applied individually to each node has so far been mostly applied digitally in hybrid optical-electronic systems. See, for example [10], or the following prior art documents:

[21] T. W. Hughes, M. Minkov, Y. Shi, and S. Fan, Training of photonic neural networks through in situ backpropagation and gradient measurement, Optica 5, 864 (2018).
[22] I. A. D. Williamson, T. W. Hughes, M. Minkov, B. Bartlett, S. Pai, and S. Fan, Reprogrammable electro-optic nonlinear activation functions for optical neural networks, IEEE J. Sel. Top. Quantum Electron. 26, 1 (2020).

Applying nonlinearity using hybrid optical-electronic systems involves repeatedly measuring and generating the optical state. Recent work has also realised nonlinearities optically as shown in [20].

Implementing backpropagation (steps (2) and (3)) optically is a challenge. Backpropagating through the linear interconnection between layers is straightforward, as linear optical operations are naturally bidirectional. However, when optically implementing the backpropagation algorithm in an ONN the backpropagating signal is modulated by the derivatives of the activation function of each node at its current input value. Therefore, the response of the nonlinear elements in the ONN has to be different for light propagating forwards or backwards. As a result, existing ONNs are generally trained with, or heavily aided by, digital computers, as discussed in references [10], [18], [20] and [21].

A feedforward ONN implemented and trained by using Fabry-Perot etalons to approximate the forwards and backwards response of a sigmoid nonlinearity is suggested in the following:

[23] K. Wagner and D. Psaltis, Multilayer optical learning networks, Appl. Opt. 26, 5061 (1987).

However, this approach was complex to implement, and a subsequent ONN demonstration instead using digitally calculated errors, as shown in: [24] D. Psaltis, D. Brady, and K. Wagner, Adaptive optical networks using photorefractive crystals, Appl. Opt. 27, 1752 (1988).

A further approach to an optically-trained feedforward network was proposed by Cruz-Cabrera et al. in

[25] A. A. Cruz-Cabrera, M. Yang, G. Cui, E. C. Behrman, J. E. Steck, and S. R. Skinner, Reinforcement and backpropagation training for an optical neural network using self-lensing effects, IEEE Trans. Neural Netw. 11, 1450 (2000).

This approach used a highly non-standard network architecture that transforms a "continuum of neurons" (a wavefront) as it passes through a nonlinear crystal using cross-phase modulation with a secondary "weight" beam.

In backpropagation in an ONN, the gradients with respect to the (platform-agnostic) weight matrices are mapped to the physical parameters that control these matrices. [21] proposed a method to directly obtain the gradients of these control parameters by an additional forward-propagating step. However, this scheme assumes computing the derivatives of the activation functions digitally and applying them to the backpropagating signal electro-optically.

According to a first aspect, there is provided an optical neural network having at least one layer including a plurality of nodes, each node arranged to have an optical signal input thereto, the at least one layer further including: an optical transmission element arranged such that the optical signal of each node passes through the optical transmission element in both forward and backpropagation; wherein the optical transmission element comprises a saturable optical absorption material or a saturable optical gain material, having a saturation threshold-power; wherein the optical neural network is arranged such that optical signals propagating in a forward direction have a power below the saturation threshold-power at least some of the time, such that transmission of the optical signal through the optical transmission element in a forward direction is nonlinear; and wherein the optical neural network is further arranged such that optical signals propagating in a backward direction have a power below a second threshold-power, lower than the saturation threshold-power, and transmission of the optical signal in a backward direction through the optical transmission element is approximately linear.

The optical signals transmitted in a forward direction may have a power or electric field that is variable over a range. At least part of the range may extend below the saturation threshold.

The optical neural network may further include, for each node in the layer: a divider arranged to split the forward propagating signal into a detection portion and a transmission portion, after forward propagation through the optical transmission element; and a divider arranged to split the backpropagating signal into a detection portion and a transmission portion, after backpropagation through the optical transmission element. The divider may be a beam splitter or directional coupler.

The optical neural network may comprise, for each node in the layer: a detector arranged to detect the electric field of the detection portion of the forward propagating signal; and a detector arranged to detect the electric field of the detection portion of the backpropagating signal.

The optical neural network may comprise a processor arranged to digitally multiply the electric filed of the detection portion of the backpropagating signals in the nodes of the layer with the electric filed of the detection portion of a forward propagating signal of nodes in a preceding layer, to determine a gradient of the loss function.

Alternatively, the detection portions of the backpropagating signals in the nodes of the layer may be optically interfered with the detection portion of forward propagating signals of nodes in a preceding layer, the optical neural network including detectors arranged to detect the electric field of the interfered signal to determine a gradient of the loss function.

The optical neural network may comprise an optical interconnect arranged to connect the nodes of the at least one layer to nodes of a preceding layer, wherein in forward propagation, the optical interconnect provides the electric field of the optical signal of each node in the at least one layer as the weighted sum of the electric field of the optical signals of the nodes in the preceding layer.

The backpropagating signal may be used to update the weights of the optical interconnect. The gradient of the loss function may be used to update the weights The neural network may have two or more layers. The layers may comprise one or an input layer and an output layer. Optically, the layers may comprise at least one hidden layer between the input layer and the output layer. At least the hidden layers may be as described above. The neural network may comprise an optical amplifier between layers.

The amplifier may form part of an optical interconnect between layers.

The optical transmission element may comprise a saturable optical absorption material. The optical transmission element may be formed by an atomic vapor cell, a cold atomic cloud in a magneto-optical trap or semiconductor materials.

The optical neural network may comprise an output layer having a plurality of output nodes. For each node in the output layer may comprise: a feedback signal providing a target, said target being generated by training data; and a coupler arranged to interfere an output signal from the node with the feedback signal, to generate an error signal, representing a difference between the output signal and the feedback signal; and an optical guide arrangement arranged to backpropagate the error signal through the neural network. The coupler may be any suitable beam splitter or signal coupler, such as a directional coupler.

The optical neural network may comprise an attenuator or neutral density filter arranged to reduce the intensity of the error signal to below the second threshold.

According to a second aspect, there is provided a method of training an optical neural network having one or more layers, the method comprising within each layer: forward propagating an optical signal through a saturable optical absorption material or a saturable optical gain material having a saturation threshold-power, the forward propagated signals having a power below the saturation threshold-power at least some of the time, such that transmission of the optical signal through the optical transmission module in a forward direction is nonlinear; backpropagating an optical signal through the saturable optical absorption material or a saturable optical gain material, the backpropagated signal having power below a second threshold-power, lower than the saturation threshold, and transmission of the optical signal in a backward direction through the optical transmission module is approximately linear.

The optical signals transmitted in a forward direction may have a power or electric field that is variable over a range. At least part of the range may extend below the saturation threshold.

The optical neural network may comprise a first layer having outputs coupled to the input of a second layer by a weighted optical interconnect. The method may further comprise: determining an electric field of the forward propagating signal for each node in the first layer; determining an electric field of the backpropagating signal for each node in the second layer; and based on the electric field of the forward propagating signals in the first layer, and the backpropagating signals in the second layer, updating the weights of the weighted interconnect.

The method may comprise amplifying the signal between adjacent layers in the optical neural network.

The method may comprise an output layer having a plurality of output nodes. The method may comprise, for each output node: interfering an output signal from the node with the feedback signal, to generate an error signal, said target being generated by training data; and said error signal representing a difference between the output signal and the feedback signal; and backpropagating the error signal through the neural network.

The method may comprise attenuating the error signal to reduce the intensity of the error signal to below the second threshold.

According to a third aspect, there is provided a neural network trained according to the first aspect.

According to a fourth aspect, there is provided an optical neural network including an output layer having a plurality of output nodes; for each node in the output layer: a feedback signal providing a target, said target being generated by training data; and a coupler arranged to interfere an output signal from the node with the feedback signal, to generate an error signal, representing a difference between the output signal and the feedback signal; and an optical guide arrangement arranged to backpropagate the error signal through the neural network.

The coupler may be any suitable beam splitter or signal coupler, such as a directional coupler.

The optical neural network of the fourth aspect may comprise an attenuator or neutral density filter arranged to reduce the intensity of the error signal to below the second threshold.

According to a fifth aspect, there is provided an optical neural network comprising one or more layers, each layer having a plurality of nodes, each node provided by an optical signal. The optical neural network may comprise one or more optical transmission elements in each layer, comprising a saturable optical absorption material or a saturable optical gain material. The one or more optical transmission elements may be arranged such that the optical signal from each node passes through an optical transmission element. The forward propagating signals may be in the non-saturated region at least some of the time, such that transmission of the optical signal of the node through the optical transmission element applies a nonlinear activation function at least some of the time.

The optical signals transmitted in a forward direction may have a power or electric field that is variable over a range. At least part of the range may extend below the saturation threshold.

According to a sixth aspect, there is provided an optical neural network having a saturable optical absorption material or a saturable optical gain material arranged to apply a nonlinear activation function to optical signals transmitted through the network the forward propagating signals having power below a saturation threshold at least some of the time.

The optical signals transmitted in a forward direction may have a power or electric field that is variable over a range. At least part of the range may extend below the saturation threshold.

It will be appreciated that features described in relation to any particular aspect may be applied to any other aspect, unless mutually exclusive.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views. The patent or application file contains at least one drawing executed in color. Copies of this patent or patent application publication with color drawing(s) will be provided by the Office upon request and payment of the necessary fee.

Embodiments of the invention will now be described, but way of example only, with reference to the accompanying drawings, in which:

FIG. 9 schematically illustrates a convolutional optical neural network according to a third example;

FIG. 10A shows the transmission of a saturable gain material in a further example of an optical neural network; and FIGS. 10B and 10C show the performance of a the optical neural network including a saturable gain material, compared to benchmark system;

By way of example only, embodiments of the invention will be described with reference to training of a neural network to recognise handwritten digits 0 to 9. The MNIST training dataset ([26] Y. LeCun, C. Cortes, and C. Burges, Mnist handwritten digit database, ATT Labs [Online]. Available: http://yann.lecun.com/exdb/mnist 2 (2010)) is used for this purpose. This dataset contains 28×28 pixel greyscale bitmap images 3 of handwritten digits. It will be appreciated that this particular task is given by way of example only, and that the optical neural network and techniques disclosed herein may be applied to any other task.

Figure 1:
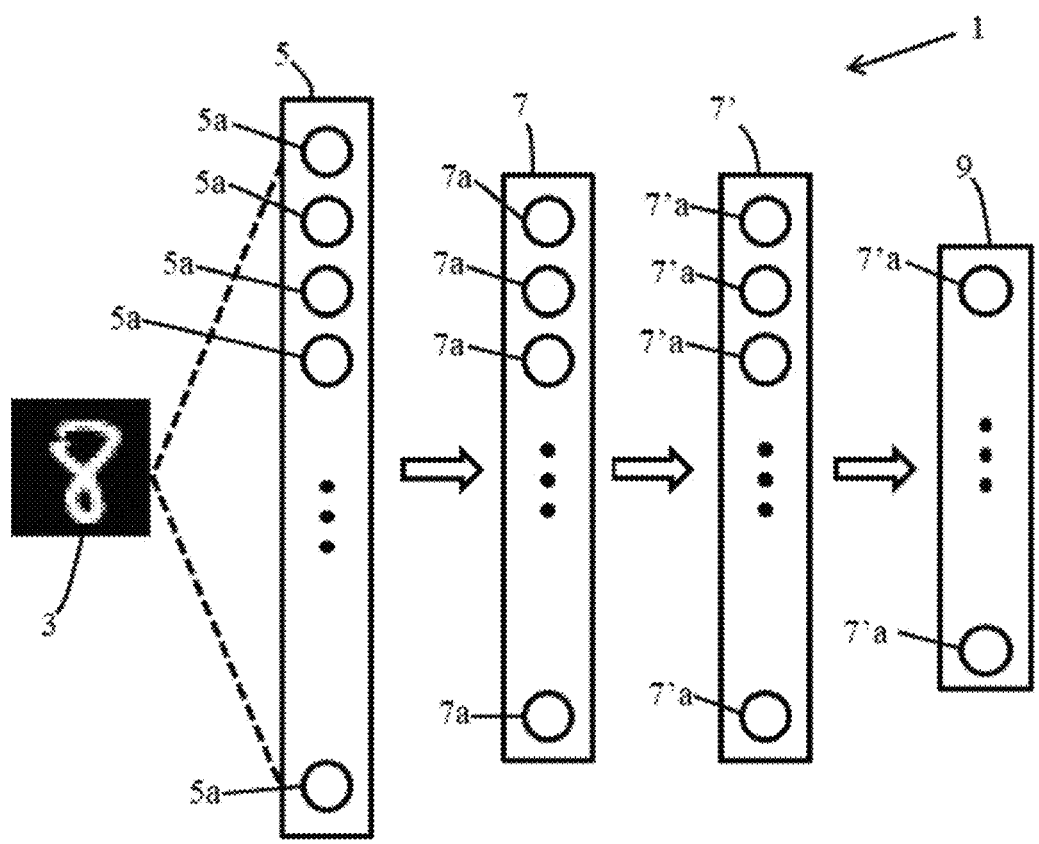
FIG. 1 schematically illustrates the structure of a neural network.

FIG. 1 schematically illustrates a fully connected ONN 1. The neural network 1 has an input layer 5 having 784 nodes 5a (one corresponding to each pixel of the input image) and an output layer 9 having ten nodes 9a (one correspond to each of the possible outputs of image recognition). Between the input layer 5 and output layer 9, two hidden layers 7, 7' are provided, each having 128 nodes 7a, 7a'.

Each node 5a, 7a, 7a', 9a within a layer 5, 7, 7' 9 is represented by the real-valued electric field of different spatial modes of light, or of light in different waveguides. As will be discussed in more detail below, optical interconnects between layers mix the different spatial modes according to weight matrices. Thus the input (z) at each node 13a, 13b, 13c in layer 1, after the optical interconnect, is given by the sum of the electric field outputs from each node in the preceding layer, weighted according to the weight matrix.

Each node 7a, 7a' in the hidden layers 7, 7' also applies a nonlinear activation function to the light as it is transmitted through the layer. This results in each node 9a in the output layer 9 having a final value, which can be used to determine the result of the processing. For example, each output node 9a may be normalised to have a value between 0 and 1 based on the detected intensity or electric field at that node 9a. In the example of image analysis to detect digits, each node 9a in the output layer 9 may correspond to a different digit. The value of the output node 9a is a measure of the likelihood of the image containing the digit corresponding to the node 9a. The digit corresponding to the output node 9a with the highest value is determined as the result of the image analysis. In an untrained ONN 1, there may be a distribution of results, and the result may be incorrect. In a trained ONN, the output node 9a corresponding to the correct digit will ideally have a value of 1 (although there may still be a distribution with a sharp peak at the correct digit).

To process an image, seed data $a^{(0)}$ is determined from the image 3. The seed data is a 728 dimension vector, with each element corresponding to the greyscale value of one of the pixels of the image 3.

The input for each node 5a in the input layer 5 is a coherent light source such as a diode laser (not shown). The activation of each input node 5a is set by optical modulators (not shown) applying amplitude modulation based on the seed data.

In forward propagation, the optical interconnects between layers map the node activations from any layer l-1 to the inputs at the next layer/as shown by equation 1a:

$$z_j^{(l)} = \sum_i w_{ji}^{(l)} a_i^{(l-1)} \tag{1a}$$

Where:
$z_j^{(l)}$ is the input of node j in layer l;
$a_i^{(l-1)}$ is the activation of node i in layer l-1; and
$w_{ji}^{(l)}$ weight matrix for the layer l, having different weights for mapping the $i^{th}$ node in layer l-1 to the $j^{th}$ node in layer l.

The activations of the nodes in layer l are then determined by applying a nonlinear activation function according to equation 1b:

$$a_j^{(l)} = g(z_j^{(l)}) \tag{1b}$$

Where $a_j^{(l)}$ is the activation of the $j^{th}$ node in layer l.

The ONN 1 shown in FIG. 1 is trained by backpropagation.

Training data such as the MNIST set comprises sets of images with the expected/target values for the output nodes 9a for the image. To train the ONN 1, training data is processed by the ONN 1, and the expected/target values at the output layer 9 are compared to the actual results to determine an error. As will be discussed in more detail below, backpropagation of the error between the expected value and actual value is used to modify the weight matrices between layers 5, 7, 7', 9 to reach convergence.

In order to backpropagate a signal, the gradient of the loss function L is calculated. The loss function represents the deviation of the value of the nodes 9a of the output layer 9 from the expected/target output. The gradient of the loss function with respect to the weights is given by equation 2

$$\frac{\partial L}{\partial w_{ji}^{(l)}} = \frac{\partial L}{\partial z_j^{(l)}} \frac{\partial z_j^{(l)}}{\partial w_{ji}^{(l)}} = \delta_j^{(l)} a_i^{(l-1)} \tag{2}$$

$$\delta_j^{(l)} = \partial L / \partial z_j^{(l)}$$

$\delta_j^{(l)}$ is referred to as the error at the $j^{th}$ node in the $l^{th}$ layer. From the chain rule it follows that:

$$\delta_j^{(l)} = \sum_k \frac{\partial L}{\partial z_k^{(l+1)}} \frac{\partial z_k^{(l+1)}}{\partial z_j^{(l)}} = g'(z_j^{(l)}) \rho_j^{(l+1)} \tag{3}$$

$$\rho_j^{(l+1)} = \sum_k \delta_k^{(l+1)} w_{kj}^{(l+1)}$$

The error at the output layer 9 ($\delta^{(L)}$) is calculated directly from the loss function (discussed below in more detail), and the errors for all preceding layers are sequentially found using equation 3. Knowing the errors and activations allows the gradients for each node in the layers following he input layer 5 to be calculated by equation 2. Each node will have a different gradient for each weight in the weight matrix associated with that node.

As will be discussed below in more detail, in an ONN 1 the transformation shown by equation 1a is implemented as a linear optical operation in the optical interconnects between layers.

The determination of $\rho_j^{(l+1)}$ in equation 3, for backpropagation involves the same weight matrix. Therefore, determination of $\rho_j^{(l+1)}$ can be implemented by backpropagation of a signal through the same optical interconnects.

From equations (1a) and (3), it can be see that whilst forward propagation applies a nonlinear activation function to the inputs (z) at a layer 7, 7', backpropagation multiplies the signal by the derivative of the activation function. Thus backpropagation applies a linear function.

Therefore, for the same transmission medium to apply the nonlinear function in forward and the linear function in backpropagation:
   (i) The transmission medium should exhibit a nonlinear response in the forward direction, to apply the activation function;
   (ii) The transmission medium should exhibit an approximately linear response in the backpropagation direction; and
   (iii) In backpropagation, the input should be modulated by the derivate of the nonlinear function applied in the forward direction.

A saturable absorber is a material that can show both linear and nonlinear transmission properties, depending on the intensity of electric field of the light passing through it. In one example of a saturable absorber, the transmission of light increases with increasing intensity (or electric field) up to a saturation threshold. The variation of the absorption with intensity is a nonlinear function until the saturation threshold is reached. At the saturation threshold, the variation of the absorption follows a linear function.

Consider a strong pump signal and a weak probe signal propagating through a saturable absorption medium. The transmission of the pump is given by equation 4:

$$E_{P,out} = g(E_{P,in}) = \exp\left(-\frac{\alpha_0/2}{1+E_{P,in}^2}\right)E_{P,in} \quad (4)$$

$\alpha_0$ is the resonant optical depth, $E_{P,in}$ is the input pump electric field and $E_{P,out}$ is the output pump electric field. All fields are assumed to be normalised by the saturation threshold.

On the other hand, a suitably weak probe, in the presence of the strong pump, does not modify the transmissivity of the saturable absorption medium (or the effect on the transmissivity is negligible compared to the pump signal). The transmission of the probe signal through the medium, in the presence of the pump signal, is given by equation 5:

$$E_{Pr,out} = \exp\left(-\frac{\alpha_0/2}{1+E_{P,in}^2}\right)E_{Pr,in} \quad (5)$$

$E_{P,in}$ is the input probe electric field and $E_{Pr,out}$ is the output probe electric field. As can be seen from equation 5, the probe signal thus experiences linear absorption, with absorption coefficient determined by the pump signal.

Where the wavelengths of the pump and probe signal are the same, and match the absorption transition within the transition bandwidth, the phase of the electric field is unchanged, and the signals can be treated as real-valued without loss of generality.

Therefore, in an ONN 1, a saturable absorption medium can be used to apply the nonlinear activation function in forward propagation, and the linear function in backpropagation.

In the ONN 1, the forward propagating signals are chosen to be sufficiently strong to behave as the pump signal in equation 4. As discussed above, the electric field of forward propagating signals is varied across a range, depending on the information carried in the node. The forward propagating signals are also chosen such that at least a portion of the range across which forward propagating signals are carried lies within the unsaturated region. Therefore, for at least some of the time, the forward propagating signals are below the saturation threshold.

For example, where the value in the node is in a range between 0 and 1, the electric field when the node carries a value of 0 may be below the saturation threshold, the electric field when the node carries a value of 1 may be above the saturation threshold and the electric field may be varied between these limits.

In some examples, the average power (electric field) of the may be at or near the saturation threshold (either above or below it). In other example, the entire range of the electric field may be below the saturation threshold.

The forward propagating signals therefore satisfy condition (i). The transmission function of the saturable absorption media, which is, overall, non-linear over the range of fields that may be used, corresponds to the nonlinear activation function (function g in equation 1b).

Conversely, the backpropagating signal is chosen to be sufficiently weak such that it behaves as the probe signal in equation 5, satisfying condition (ii).

The backpropagating signal should be below a second threshold, lower than the saturation threshold, to satisfy this condition. Below the second threshold, the transmission of the backpropagating signal is linear and the back propagating signal does not alter the transmission function of the saturable absorption medium in the presence of the stronger forward propagating signal, as discussed above.

In some cases, some signals below the second threshold may cause a small change to the transmission of the saturable absorption medium. However, such small changes may be considered negligible, and the saturable absorber will still provide a good approximation to condition (ii), as discussed below.

As with the forward propagating signal, the back propagating signal may be varied over a range dependent on the error carried on the signal. The maximum value of the error is kept below the second threshold.

In one example, the second threshold may be at most 10% of the saturation threshold. However, this is by way of example only, and the second threshold may be higher or lower.

The derivative of the pump transmission is given by equation 6:

$$g'(E_{P,in}) = \left[1 + \frac{\alpha_0 E_{P,in}^2}{(1+E_{P,in}^2)^2}\right]\exp\left(-\frac{\alpha_0/2}{1+E_{P,in}^2}\right) \quad (6)$$

In many instances, the factor in square brackets can be treated as constant or nearly constant. Therefore, the derivative of the pump transmission (equation 6) is a good approximation to the absorption coefficient of the probe, ($E_{Pr,out}/E_{Pr,in}$) taken from equation 5. Therefore the backpropagating signal (probe) is also attenuated by the derivate of the nonlinear activation function (condition (iii)). As shown in the examples below, the approximation error doesn't degrade the neural network performance.

FIGS. 2A and 2B illustrates the transmission 101a, 101b calculated for a strong pump signal in a saturable absorption medium for $\alpha_0$=1 and 30 respectively, as a function of the pump input strength ($E_{P,in}$). FIGS. 2C and 2D show the calculated derivatives (solid lines) 101c, 101d of the pump transmission for $\alpha_0$=1 and 30 respectively, as a function of the pump input strength. In FIGS. 2A to 2D, the unsaturated (nonlinear) region is labelled (i) and the saturated region is labelled (ii).

As can be seen from FIGS. 2A and 2B, high optical depth induces strong nonlinearity in the unsaturated region, and a sufficiently strong pump renders the medium nearly transparent in the saturated region.

FIGS. 2C and 2D also show the probe transmission in the presence of a strong pump, calculated by equation 5 without scaling (dashed line) 103c, 103d and with scaling (dotted line) 105c, 105d, as a function of the probe input ($E_{Pr,in}$). In FIG. 2C, a scaling factor of 1.2 is applied and in FIG. 2D a scaling factor of 2.5 is applied. As can be seen, the probe transmission determined by equation 5 is a good approximation of the derivative shown by equation 6, especially in the unsaturated (nonlinear) region labelled (i).

FIGS. 2C and 2D and equation 6 therefore show that the saturable absorption material provides a good approximation to criteria (iii). Therefore the optical operations for both forwards and backpropagation can be realised using a saturable absorber.

Figure 3:
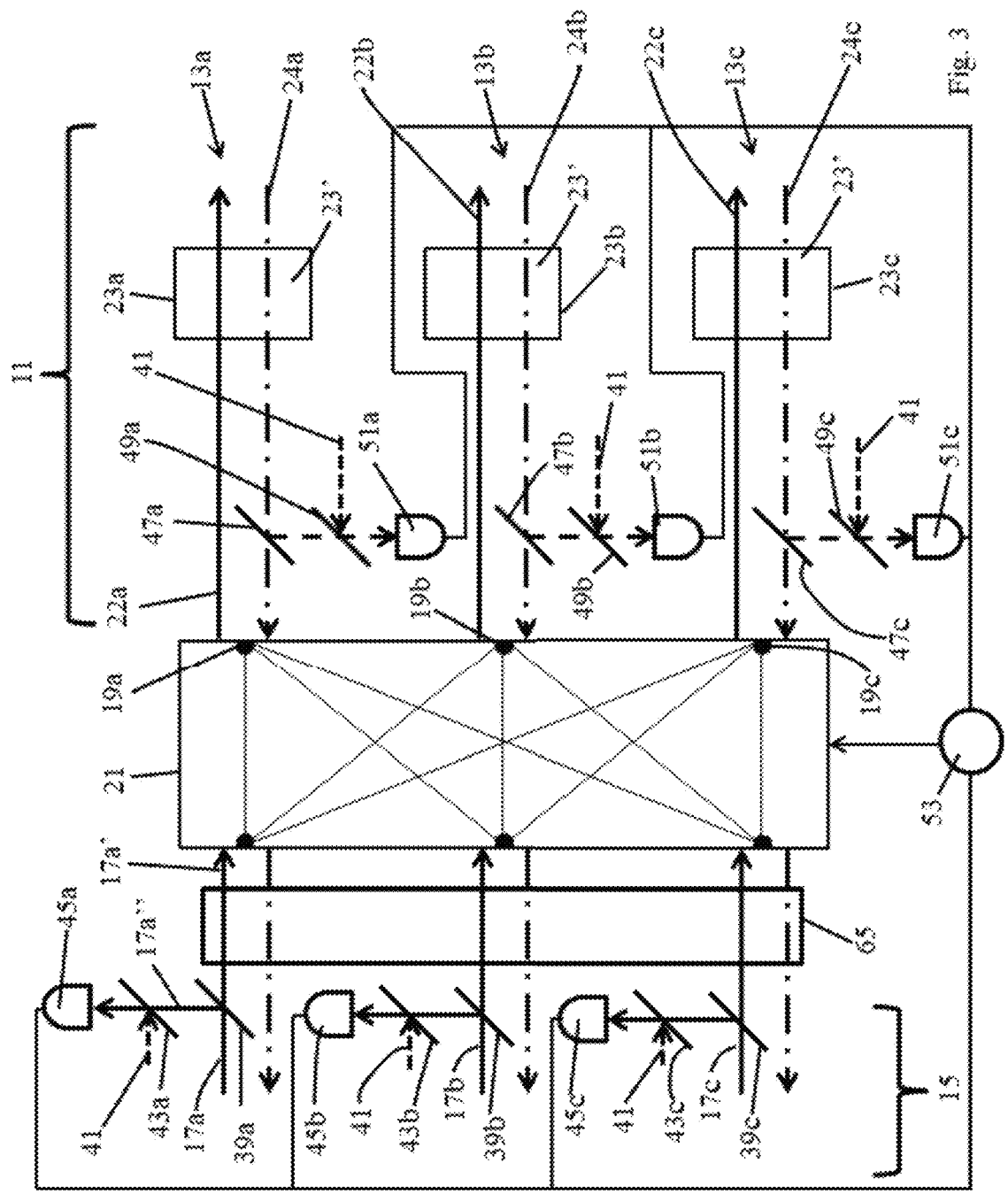
FIG. 3 schematically illustrates the structure of a layer in an optical neural network.

FIG. 3 schematically illustrates the arrangement of a layer 11 in an ONN 1 such as shown in FIG. 1, along with the outputs of the previous layer 17a, 17b, 17c. For example, the layer 11 in FIG. 3 may be the first hidden layer 7 of FIG. 1 (in which case the outputs 17a, 17b, 17c of the previous layer 15 are the outputs from the input layer 5) or the second hidden layer (in which case the outputs 17a, 17b, 17c of the previous layer 15 are the outputs from first hidden layer 7).

For the sake of clarity, the layer 11 shown in FIG. 3 shows three nodes 13a, 13b, 13c, and the previous layer 15 also includes three nodes. However, the layers 11 may include any number of nodes 13, and the previous layer 15 may include any number of nodes. In FIG. 3, forward transmission of light is shown by solid lines, whilst the backpropagation, is shown by uneven broken lines (dot-dash lines).

An optical interconnect 21 is provided between layers 15, 11, for both forward and backpropagation. The output signal (activations) 17a, 17b, 17c of the nodes in the preceding layer 15 are coupled to the inputs 19a, 19b, 19c of the nodes 13a, 13b, 13c in the current layer 11 (when viewed in the direction of forward propagation) by the optical interconnect 21, in a manner that applies the weight matrix as discussed above with reference to equation 1a.

When the ONN 1 is implemented as an integrated platform (i.e. on chip), optical interference units that combine integrated phase-shifters and attenuators to realise the function of the optical interconnect 21 have been demonstrated (see for example reference [10], the contents of which are incorporated by reference).

A real-valued weight matrix can be factorised via singular value decomposition into the form $U\Sigma V^\dagger$, where U and V are unitary matrices and $\Sigma$ is a rectangular diagonal matrix. In optics, any unitary matrix can be implemented with a set of Mach-Zehnder interferometers consisting of beam splitters and phase shifters. For further information, see the below reference which is incorporated by reference.

[27] M. Reck, A. Zeilinger, H. J. Bernstein, and P. Bertani, Experimental realization of any discrete unitary operator, Phys. Rev. Lett. 73, 58 (1994).

The diagonal matrix can be realised with optical attenuators. Therefore, in integrated photonics, optical interference units with thermo-optical phase shifters or electro-optical phase shifters together with integrated attenuators can be used to represent the weight matrix. For further information see, the following documents, which are incorporated by reference:

[28] N. C. Harris, Y. Ma, J. Mower, T. Baehr-Jones, D. Englund, M. Hochberg, and C. Galland, Efficient, compact and low loss thermo-optic phase shifter in silicon, Opt. Express 22, 10487 (2014).

[29] G. T. Reed, G. Mashanovich, F. Y. Gardes, and D. J. Thomson, Silicon optical modulators, Nat. Photonics 4, 518 (2010).

Programmable optical interference units with Mach-Zehnder interferometers have been demonstrated, as shown in the following reference, which is incorporated by reference:

[30] N. C. Harris, G. R. Steinbrecher, M. Prabhu, Y. Lahini, J. Mower, D. Bunandar, C. Chen, F. N. Wong, T. Baehr-Jones, M. Hochberg, and S. Lloyd, Quantum transport simulations in a programmable nanophotonic processor, Nat. Photonics 11, 447 (2017).

In a free-space implementation of the ONN 1, the function of the optical interconnect 21 can be realised with optical vector-matrix multiplication, for example using a spatial light modulator as shown in the following reference, which is incorporated by reference:

[31] Spall, J., Guo, X., Barrett, T. D. and Lvovsky, A. I., 2020. Fully reconfigurable coherent optical vector-matrix multiplication. Optics Letters, 45(20), pp.5752-5755.

Node values are encoded on the electric field of the propagating beam, and real-valued weight matrices can be encoded on liquid-crystal spatial light modulators or digital micromirror devices. Precise amplitude and phase control of light can be achieved by modulating the phase grating pattern of the liquid-crystal spatial light modulators, as discussed in following reference, which is incorporated by reference:

[32] V. Arrizon, U. Ruiz, R. Carrada, and L. A. Gonzalez, Pixelated phase computer holograms for the accurate encoding of scalar complex fields, J. Opt. Soc. Am. A 24, 3500 (2007).

Although digital micromirror devices are designed as binary amplitude modulators, multilevel control can be easily achieved by grouping multiple physical binary pixels as a logical multilevel pixel. Taking a block of 10×10 modulator pixels to represent a node/weight block, a free-space ONN with 200-400 nodes per layer can be built.

Figure 4:
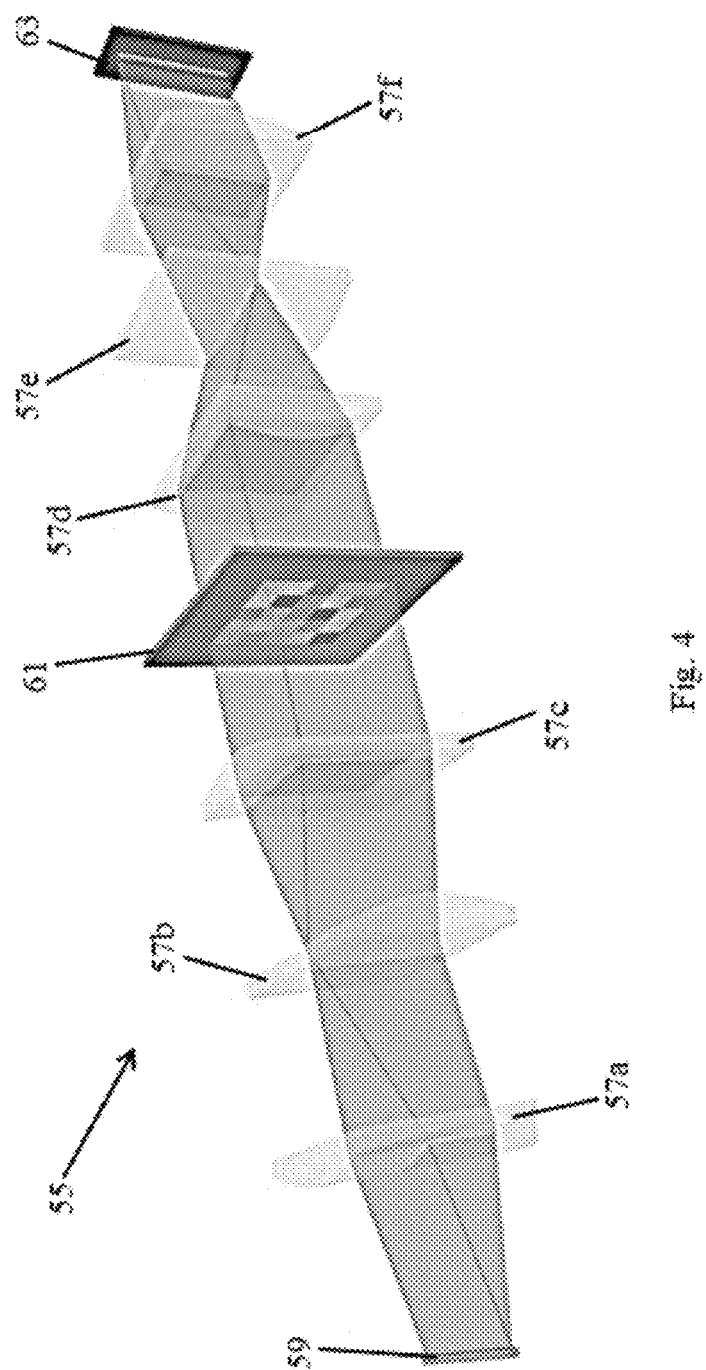
FIG. 4 schematically illustrates a coherent programmable optical vector-matrix multiplication system

FIG. 4 illustrates a coherent programmable optical vector-matrix multiplication system 55 constructed with cylindrical lenses 57a-f performing 4F imaging and Fourier transforms as discussed in reference [9] which is incorporated by reference. The lenses 57a-f are arranged in series along the transmission path of light. A matrix mask 61 is provided between the third and fourth lenses in the series.

An input vector $a_i$ provided at the input 59 is prepared as a set of spatial modes distributed horizontally. The vector components are imaged in the horizontal (x) dimension by the first and third lenses 57a, 57 cm to the plane of the matrix mask 61. Each of these modes initially diverge in the vertical (y) dimension. However, the modes are collimated in the y direction by the second lens 57b in the series.

In the plane of the matrix mask 61, the vector components are multiplied by the matrix elements $w_{ji}$, so the spatial configuration of the field after the matrix mask is given by $w_{ji} a_i$.

The fourth and sixth lenses 57d, 57f realise 4F imaging of the matrix mask plane in the y dimension, and the fifth lens 57e realises a Fourier transform in the x dimension. Only zero spatial frequency components at the output plane carry the correct result vector-matrix multiplication result. Therefore, a narrow slit 63 extending along the y direction is placed at output plane to pass the near-zero spatial frequency components of the Fourier transformed field, corresponding to the summation $\Sigma_i w_{ji} \alpha_i$.

To evaluate the power efficiency of the slit 63, the vector and matrix entries were set to be one so that the output plane shows a sine spectrum (assuming square aperture of the system). From this, average output accuracy of about 95% was estimated and the power efficiency of the slit is about 50%. Therefore, higher power efficiency can be obtained.

The digital micromirror device bandwidth is about 10 kHz, and the maximum bandwidth of a liquid-crystal spatial light modulator is sub-kHz, as discussed in the following:

[33] H. M. P. Chen, J. P. Yang, H. T. Yen, Z. N. Hsu, Y. Huang, and S. T. Wu, Pursuing high quality phase-only liquid crystal on silicon (LCoS) devices, Appl. Sci. 8, 2323 (2018).

Therefore the update speed of vector-matrix multiplication in the free space implementation is slower than that of an optical interference unit.

Referring to FIG. 3, each node 13a, 13b, 13c is also provided with an optical transmission element 23a, 23b, 23c in the transmission path of the light in the node 13a, 13b, 13c. Forward propagating optical signals 22a, 22b, 22c and backpropagating signals 24a, 24b, 24c are transmitted through the optical transmission element 23a, 23b, 23c.

The optical transmission element 23a, 23b, 23c comprises a transmission cell of a saturable absorption material 23'.

There are many different material choices for a saturable absorption material 23' in an ONN 1. In free-space an atomic vapor cell or a cold atomic cloud in a magneto-optical trap may be used. Optical depths of $\alpha_0 \geq 10$ can be easily obtained. To prevent the beams from significant divergence inside atomic medium, the Rayleigh length $z_R = \pi \omega_0^2 / \lambda$ should be larger than atomic sample thickness, which is typically on the order of a centimeter. Therefore, the beam waist $\omega_0$ in the atomic medium can be about 100 μm, taking the resonant wavelength of the $^{87}$Rb D$_2$ line transition. Based on this, 100 nodes may be accommodated within a sample with a width of 2 cm. For a free space implementation, an atomic vapor cell may also be used as the saturable absorber.

Alternatively, reference [20] and the following references, which are incorporated by reference, show on-chip nonlinear saturable absorption media:

[34] Z. Cheng, H. K. Tsang, X. Wang, K. Xu, and J.-B. Xu, In-plane optical absorption and free carrier absorption in graphene-on-silicon waveguides, IEEE J. Sel. Top. Quantum Electron. 20, 43 (2013).

[35] Q. Bao, H. Zhang, Y. Wang, Z. Ni, Y. Yan, Z. X. Shen, K. P. Loh, and D. Y. Tang, Atomic-layer graphene as a saturable absorber for ultrafast pulsed lasers, Adv. Funct. Mater. 19, 3077 (2009), which.

Examples of on-chip nonlinear saturable absorber include semiconductors or graphene layers featuring low threshold and large modulation bandwidth integrated into nanophotonic circuits.

Atomic vapor cells can also be integrated on a silicon chip and coupled to integrated waveguides, as demonstrated in the following references, which are incorporated by reference:

[36] W. Yang, D. B. Conkey, B. Wu, D. Yin, A. R. Hawkins, and H. Schmidt, Atomic spectroscopy on a chip, Nat. Photonics 1, 331 (2007).

[37] R. Ritter, N. Gruhler, W. Pernice, H. Kubler, T. Pfau and R. Low, Atomic vapor spectroscopy in integrated photonic structures, Appl. Phys. Lett. 107, 041101 (2015).

In these implementations, optical depth of $\alpha_0 = 1$ to $\alpha_0 = 2$ have been achieved.

FIG. 3 illustrates an individual optical transmission element 23a, 23b, 23c (vapor cell) for each node 13a, 13b, 13c to provide element-wise activation. In other cases, element wise activation can be accommodated for multiple nodes 13a, 13b, 13c in a single atomic cloud or vapor cell, and so the arrangement of FIG. 3 is given by way of example only.

The layer 11 shown in FIG. 3 may be any one of the hidden layers 7, 7'. As discussed above, the input layer 5 is simply an array of light source (not shown) with suitable attenuators. The output layer 9 comprises an optical interconnect 21 for coupling to the previous layer, but no optical transmission element 23a, 23b, 23c is provided.

In order to implement backpropagation and training, the gradient of the loss function should be determined. As discussed in relation to equation 3, once the error is determined for the output layer 9 of a neural network 1, the error (and hence loss function gradient) can successively be determined for each layer 5, 7, 7'.

To implement training optically, the loss function at the output layer is determined using the mean-squared-error loss function, shown in equation 7a:

$$L = \sum_i \frac{1}{2}(z_i^{(L)} - t_i) \qquad (7a)$$

Where $z_i$ is the output at node i in the output layer (L) 9 and $t_i$ is the target value for that node, known from training data. From equation 7a and equation 2, the error at a node I in the output layer can be found as:

$$\delta_i^{(L)} = \frac{\partial L}{\partial z_i^{(L)}} = z_i^{(L)} - t_i \qquad (7b)$$

Figure 5:
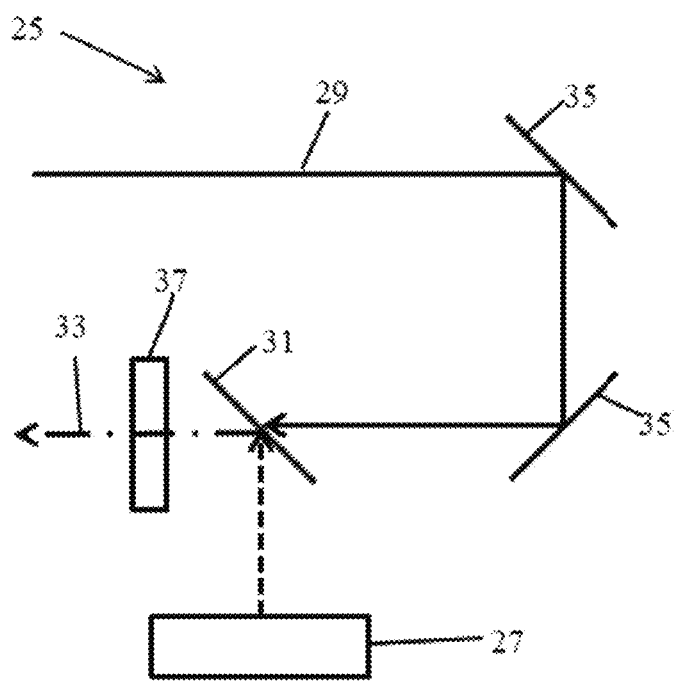
FIG. 5 illustrates a system for optically determining the error at a node in an output layer of an optical neural network.

FIG. 5 illustrates a system 25 for optically determining the error at a node 9a in the output layer 9. Within this system, a coherent light source 27, such as a diode laser, provides a reference output of the expected/target output for the node, based on the training data.

The reference output from the coherent light source 27 is destructively interfered with the output 29 of the node 9a in the output layer 9 at a beam splitter 31 to determine the error signal 33. In order to reduce the power of the error signal such that its transmission is linear or approximately linear during backpropagation, the power may be attenuated by neutral density filters 37 or the like. The beam splitter 31 used to determine the error signal may be any suitable coupler, directional coupler, beam splitter or the like.

As an alternative, the error signal may be determined electronically using an FPGA (not shown). The electric processor determines an error and controls operation of a light source (not shown) to generate the error signal.

No matter how generated, the error signal is reinjected into the neural network 1 for backpropagation. Mirrors 35 redirect the signal such that it is directed in the correct direction.

It will be appreciated that within each node 13a, 13b, 13c the forward propagating signal and backpropagating signal occupy the same spatial modes. Physical separation is only shown in the Figures for illustrative purposes. Furthermore, the optical interconnects 21 are bi-directional such that in backpropagation the weighting is applied in the same manner as in forward propagation.

Returning to FIG. 3, it can be seen that from the above description, the backpropagation of the signals through a layer 11 in the ONN 1 is provided optically. The ONN 1 is tuned by modifying the weights applied by the optical interconnect 21. To determine the changes made to the weights, the gradient of the loss function is determined according to equation 2.

In the layer 11 shown in FIG. 3, the gradient of the loss function is determined by taking measurement of the forward propagating signal from the previous layer 15 and backpropagating signal in the layer 11.

At the output 17a, 17b, 17c of each node in the preceding layer 15 the forward propagating signal is split by corresponding beam splitters 39a, 39b, 39c. Referring to the first node 17a only, for clarity, a detection portion 17a'' of the signal is diverted for detection, whilst the remainder of the signal remains in the ONN 1 as a transmission portion 17a'. Any suitable beam splitter may be used, for example a 50/50 or any other suitable split such as 90/10, where the larger intensity output is forward propagated. Alternatively, any suitable directional coupler may be used.

The portion of the signal redirected for detection is mixed with a local oscillator 41 at a second beam splitter (or directional coupler) 43a, 43b, 43c, and the electric field is detected by a photo diode or other detector 45a, 45b, 45c in a homodyne or heterodyne detection system. This provides the activation $\alpha_i^{(l-1)}$ of node i in layer l−1.

In the backpropagating direction, the signal before the optical transmission elements 23a, 23b, 23c approximates $\rho_j^{(l+1)}$. Backpropagation through the optical transmission elements 23a, 23b, 23c attenuates the signal to approximate $\delta_i^{(l-1)}$. The backpropagating signal is divided by beam splitters 47a, 47b, 47c located between the optical transmission elements 23a, 23b, 23c and the optical interconnect 21. Referring only to the first node 13a for clarity, a first portion 24a' of the signal is provided for continued backpropagation through the network as a transmission portion. A second portion 24a'' is provided for detection, as a detection portion, to obtain a measure of $\delta_i^{(l-1)}$ As with the measurement of $\alpha_i^{(l-1)}$, the detection portion 24a'' is mixed with local oscillator 41 at beam splitters 49a, 49b, 49c for detection of the electric field by a photo diode or other detector 51a, 51b, 51c by homodyne or heterodyne detection. Any suitable beam splitter or directional coupler may be used, for example a 50/50 or any other suitable split such as 90/10, where the larger intensity output is backpropagated.

The electrical signals from the photodetectors 45a, 45b, 45c, 51a, 51b, 51c for all nodes 13a, 13b, 13c are directed to processing means 53 which multiplies the electric filed of the signals to determine the gradient of the loss function according to equation 2. This is then used to update the weights applied by the optical interconnect 21. The processing means may comprise a GPU, FPGA, ASIC or other suitable processor.

Where the ONN 1 is implemented on-chip, the weights are applied by the optical interconnect using phase shifters and attenuators, as discussed above. The phase shifters and attenuators are controllable to modify the change in phase and the signal attenuation. The control parameters are thus changed to modify the weights applied. Reference [29] provides detail on mapping new weights to phase shifter settings. Reference [21] discloses an alternative method for mapping the gradients (equation 2) to the control parameters for the phase shifters and attenuators. This applies an in situ optical backpropagation scheme to obtain gradients of phase shifter permittivities optically.

Where the ONN 1 is implemented in free space, discrete blocks of pixels in the spatial light modulator directly control individual weights. In the vector-matrix multiplication discussed above, each weight is independently controlled by a logical pixel (a block of pixels) on the liquid-crystal spatial light modulator or digital micromirror device. Therefore, the weight update can be implemented with weight gradients via a calibrated look-up table.

The ONN 1 discussed above comprises a number of passive optical elements. These can only implement weighted connections that satisfy conservation of energy. For deep networks with multiple layers, absorption through the saturable absorber 23a, 23b, 23c will reduce the field amplitude available to subsequent layers. Optionally, this can be counteracted by inter-layer amplification using, for example, semiconductor optical amplifiers. The following document, which is incorporated by reference, provides further details on semiconductor optical amplifiers:

[38] M. J. Connelly, Semiconductor optical amplifiers (Springer Science & Business Media, 2007).

Semiconductor optical amplifiers can offer 30 dB amplification with hundreds of ps response time, and can be integrated on waveguides.

As shown in FIG. 3, an amplifier 65 of gain $A^{(l)}$ is provided in front of an optical interconnect 21 (which has matrix $W^{(l)}$). Together the amplifier 65 and optical interconnect 21 comprise the desired weight matrix $w^{(l)} = A^{(l)} W^{(l)}$.

Two estimates are used to provide the lower and upper bound of the gain. For the lower bound, the energy conservation in a passive system implies that $$\sum_j (W_{ij}^{(l)})^2 \leq 1 \qquad (8)$$

$$\sum_i (W_{ij}^{(l)})^2 \leq 1$$

Figures 6A, 6B:
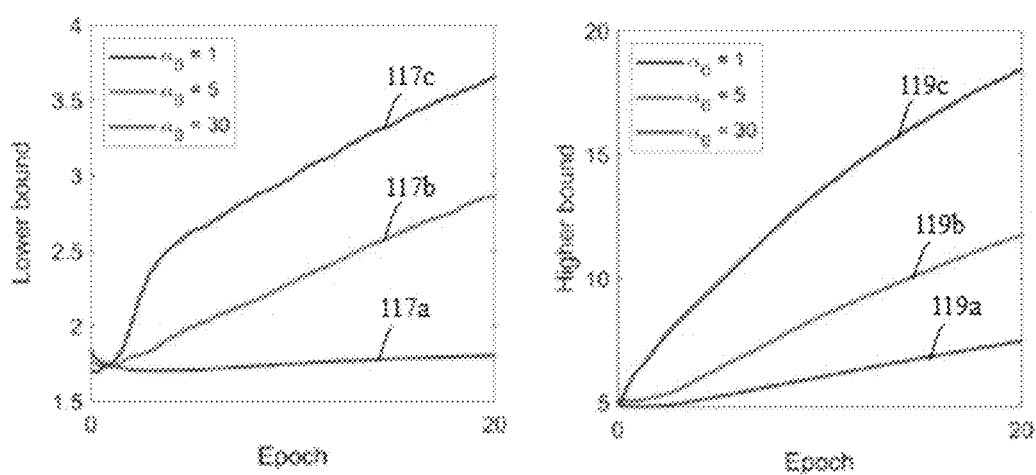
FIGS. 6A and 6B illustrate the lower and upper bounds for inter layer gain in an optical neural network.

In order to satisfy these conditions, the gain A should not be lower than max $(\max_i \Sigma_j (w_{ij}^{(l)})^2, \max_j \Sigma_i (w_{ij}^{(l)})^2)$. FIG. 6A shows this lower bound for $\alpha_0=1$ (line 117a), $\alpha_0=5$ (line 117b) and $\alpha_0=30$ (line 117c).

To estimate the upper bound of the gain, the square of the highest singular value $\Sigma_{max}$ of the weight matrix $w^{(2)}$ was taken. If $A \geq \Sigma_{max}$, then no singular values of $W^{(2)}$ exceed 1, meaning that this matrix can be implemented as discussed above. The upper bound of the gain is plotted in FIG. 6B, which shows the upper bound for $\alpha_0=1$ (line 119a), $\alpha_0=5$ (line 119b) and $\alpha_0=30$ (line 119c).

From the plots in FIGS. 6A and 6B, it can be seen that at $\alpha_0=30$, one stage of power amplification with approximately 10 dB gain may be used. At lower optical depth, the gain is generally smaller.

The optical power consumption in an ONN 1, such as shown in FIG. 1, depends on the network architecture and implementation details. For example, for a fully-connected network with N=1000 units per layer, with saturable absorber optical nonlinearities implemented on the $^{87}Rb$ $D_2$ line is considered.

For the saturable absorber nonlinearities discussed above, the saturation intensity is given by equation 9 (see also reference [39] D. A. Steck, Rubidium 87 D Line Data, http://steck.us/alkalidata/rubidium87numbers.pdf.):

$$I_{sat} = \frac{\hbar\omega\Gamma}{2\sigma_0} = 16.6 \ \mu\text{Wmm}^{-2} \quad (9)$$

$\Gamma=2\pi\times6$ MHz is the natural linewidth, and $\sigma^0=3\lambda^2/(2\pi)$ is the resonant absorption cross section. For beams with a waist of $\omega_0=100$ μm, this corresponds to a saturation power of Psat≈500 nW per node, and total saturable absorber input power on the order of 500 μW.

An optical pulse longer than the excited state life time saturates the saturable absorber. In the example discussed above, the excited state lifetime is $\Gamma^{-1}=26$ ns, but this is by way of example only and will vary for different saturable absorbers and light pulses. The energy cost of a single forward pass through the network is then on the order of a fraction of a nanojoule, and the backpropagation energy cost is negligible. Since a single interlayer transition involves vector matrix multiplication with $N^2$ multiplications, the energy cost per multiply-accumulate operation can be estimated to be less than a femtojoule. These estimates do not include peripheral energy costs in powering and sustaining the instruments and stabilising the system.

In use, the ONN 1 is operated with the average power of the forward signal close to the saturation threshold, whilst the backpropagated signal has a lower power such that it does not alter the absorptivity of the saturable absorber, as discussed above.

A saturable absorber with any suitable non-linear function may be used. In the example discussed above, the transmission function of the saturable absorber is non-linear below the saturation threshold and linear above it. In other examples, the transmission function may be linear below and above the saturation threshold, or non-linear below and above the threshold. In either case, the transmission function is different above and below the saturation threshold, such that the transmission function is, overall, non-linear over the range of values. In yet further examples, the transmission function may be linear below the threshold and non-linear above the threshold.

In the ONN 1 discussed above, information propagates through the network in both forward and back directions without interconversion between optical and electronic form. The only parts that use electronics are:
- The homo- or heterodyne measurements of the activations ($a^{(l)}$) and error terms ($\delta^{(l)}$)) at each layer;
- generating the inputs at the input layer 5, the local oscillator signal 41, and the target signals 27 for determining the loss function (or the error signal if the loss function is determined digitally); and
- updating the weights.

In practice, the update of the weights is calculated not for each individual image in the training set, but as average for multiple images (a "mini-batch"), hence the speed of this operation is not necessarily a limiting factor for the ONN performance. To determine the updates to the weights the product $\delta_j^{(l)}a_i^{(l-1)}$ is calculated, and averaged over the mini-batch. This operation can be implemented using electronic gate arrays (not shown). For a network with L layers of N nodes, this uses 2LN measurements and $LN^2$ offline multiplications. Alternatively, the multiplication can be realised by direct optical interference of the two signals followed by intensity measurement. For this measured, $2LN^2$ photodetectors are used, but the need for reference beams and offline multiplications is eliminated.

The primary latencies associated with the optical propagation of the signal in the ONN 1 are due to the bandwidths of the saturable absorbers and intra-layer amplifiers. Further processing speed limitations are present in the photodetection and multiplication of $\delta_j^{(l)}a_i^{(l-1)}$ as well as conversion of the computed weight matrix gradients to their actuators within the ONN 1. This latter conversion however occurs once per training batch, so this limitation can be amortised by using large batches.

Generating the inputs and targets is decoupled from the calculation performed by the ONN 1 and uses fast optical modulators, which are known.

Example 1—Examining Approximate Errors

To investigate how the approximation of the derivatives affects performance of an ONN 1, the machine learning task of image classification was considered. The first set of numerical experiments considered was to classify images of handwritten digits from 0 to 9, taken from the MNIST [28] dataset.

In this example, the ONN contains an input layer 5 having 728 nodes, each corresponding to a different pixel of the image. The output layer 9 contains ten nodes 9a whose target values are between 0 and 1 dependent on the digit encoded in the bitmap ("one-hot encoding"). For this first example, a network architecture with a single 128-node 7a hidden layer 7 was used. The hidden layer 7 is connected to the input layer 5 by a first optical interconnect 21, and the output layer 9 is connected to the hidden layer by a second optical interconnect 21.

Initially, the activation function was considered to be provided by a saturable absorber with an optical depth of $\alpha_0=10$. For the chosen network architecture, this provides (97.3±0.1) % classification accuracy after training, with no difference in performance regardless of whether the true derivatives (Eq. (6)) or the optically-obtainable approximation of the derivative are used.

Figure 7A:
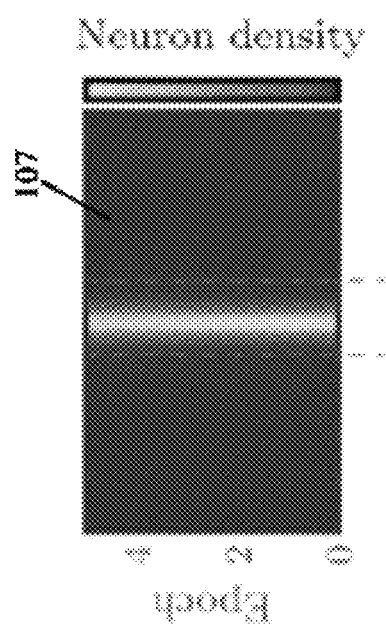
FIG. 7A shows the distribution of node inputs during training of a first example of an optical neural network.
Figure 7C:
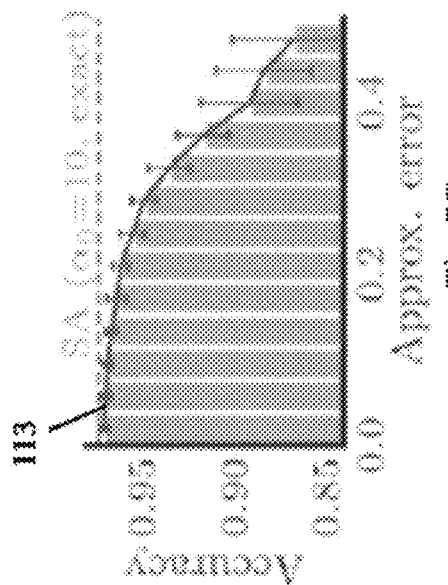
FIG. 7C illustrates the performance loss associated with approximating activation function derivatives with random functions in the first example of an optical neural network.
Figure 7B:
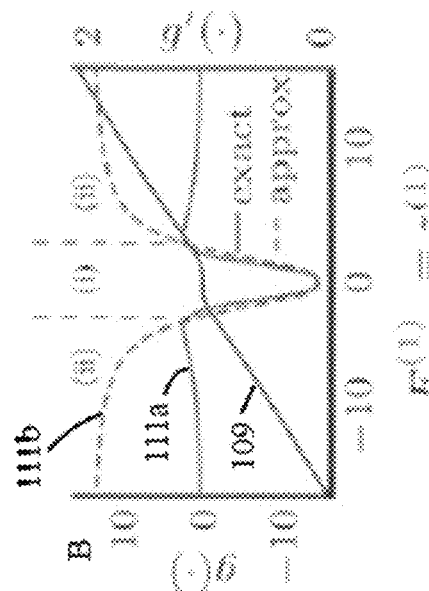
FIG. 7B shows the transmission of a saturable absorber in the first example of an optical neural network.

FIG. 7A shows the distribution 107 of node inputs ($z_{(i)}$) during training for example 1, whilst FIG. 7B shows the transmission 109 of an optical transmission element 23 comprising a saturable absorber material 23' with $\alpha_0=10$, along with the exact 111a and (rescaled for easier comparison) optically approximated 111b transmission derivatives.

From FIG. 7A, it can be seen that the node inputs are concentrated in the unsaturated region (i) of the saturable absorber activation function, g(·). This is a consequence of the fact that the expressive capacity of neural networks arises from the nonlinearity of its nodes. Therefore, to train the network, the optically-obtained derivatives should approximate the exact derivatives (up to a fixed scaling as previously discussed) in only this nonlinear region. Furthermore, since the node inputs are concentrated in the unsaturated region the error in the approximation of the derivative in the linear region (ii) is less impactful on the training.

To evaluate how training was affected by imprecision in the derivatives used the derivative g'(•) was replaced with random functions of varying similarity to the true derivative within the nonlinear region.

Figure 2:
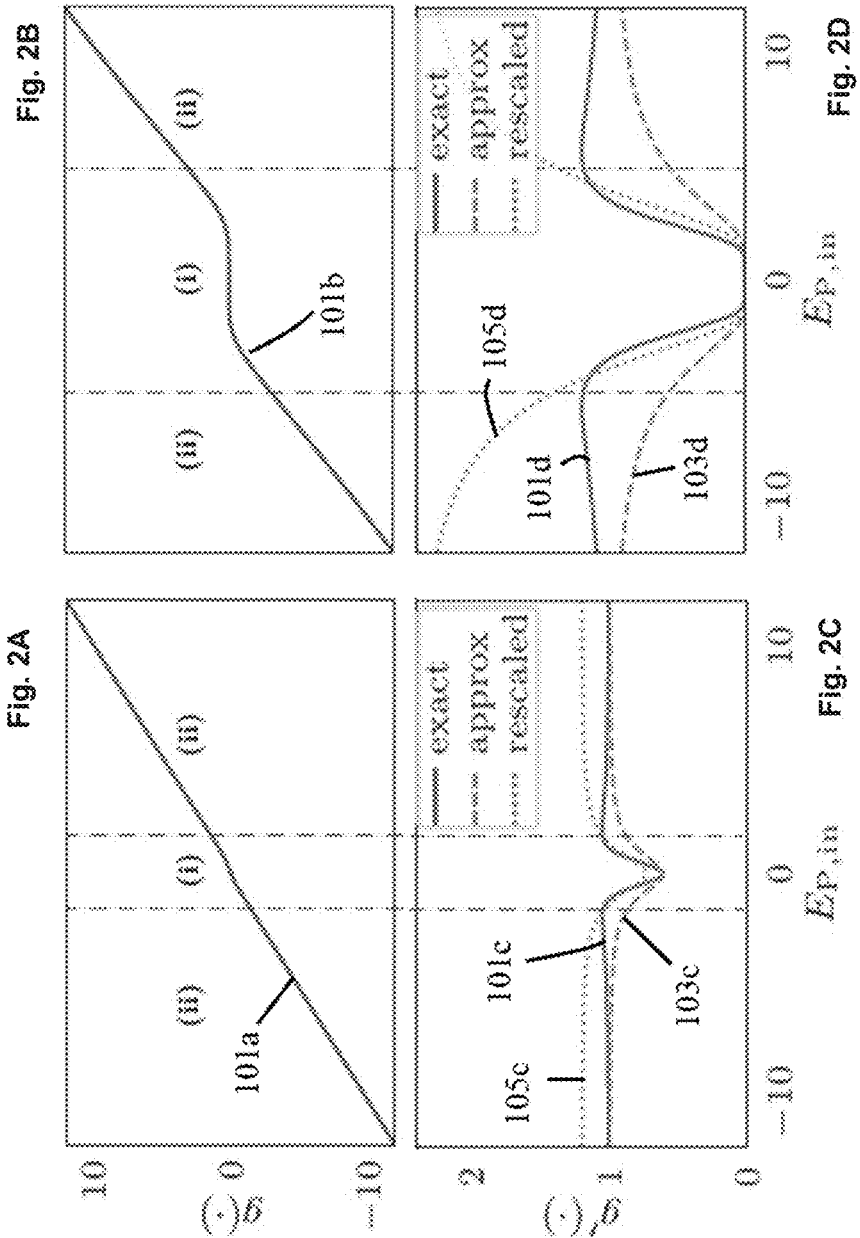
FIGS. 2A and 2B illustrate the transmission of a strong pump signal through a saturable absorber.
FIGS. 2C and 2D illustrate the transmission of a weak probe signal through a saturable absorber.

The response of a saturable absorption nonlinearity can be considered in two regimes, nonlinear (unsaturated) and linear (saturated), which are labelled (i) and (ii) in FIG. 2, respectively. During the network training, the node input values ($z_j^{(l)}$) are primarily distributed in the nonlinear region (see FIG. 7A above). The node input is modelled as a Gaussian distribution within this region:

$$p(z) = \frac{1}{\sqrt{2\pi}\,\sigma} \exp\left(-\frac{z^2}{2\sigma^2}\right) \qquad (10)$$

Where $2\sigma$ is the width of region (i).

The similarity, S, is then defined as the reweighted normalised scalar product between the accurate and approximate derivatives:

$$S = \frac{\left|\int f(z) g'(z) p(z) dz\right|^2}{\int [f(z)]^2 p(z) dz \cdot \int [g'(z)]^2 p(z) dz} \qquad (11)$$

According to the Cauchy-Schwarz inequality, S is bounded by 1 and therefore so is the average approximation error, 1−S.

200 random functions were generated for f, with different approximation errors. First, an array of pseudo-random numbers ranging from 0 to 1 were generated. This was concatenated with the flipped array to make them symmetric like the derivative g'(*), and then a shape-preserving interpolation was used to obtain a smooth and symmetric random function. The network was trained once with each of the generated f's.

FIG. 7C illustrates the performance loss 113 associated with approximating activation function derivatives g'(−) with random functions, plotted as a function of the approximation error, for $\alpha_0 = 10$.

From FIG. 7C, it can be seen that the performance appears robust to approximation errors, defined as 1−S, of up to approximately 15%. This potentially surprising observation may be explained by noting that gradient descent will converge even if the update vector for the weight matrix deviates from the direction towards the exact minimum of the loss function, so long as this deviation is not too significant.

Figure 7D:
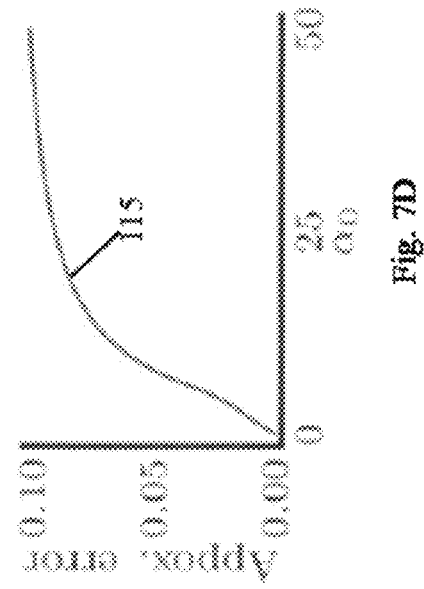
FIG. 7D shows the average error of the derivative approximation as a function of the optical depth of a saturable absorber in the first example of an optical neural network.

FIG. 7D shows the average error 115 of the derivative approximation (5) as a function of the optical depth of a saturable absorber. When the approximate derivatives given by equation 5 are used, this error saturates at approximately 10% for increasing optical depth, so no significant detrimental effect on the training accuracy can be expected. These results suggest that the ONN 1 disused above would still be effective in a noisy physical setting and that ONN 1 will function well for a broad range of optical nonlinearities. In other words, a wide range of saturable absorbers may be used.

Example 2—Image Classification

ONNs 1 with saturable absorber nonlinearities are now compared to state-of-the-art ANNs. To do this, two different network architectures, deeper than the network architecture than in example 1 were used for a range of image classification tasks:

A fully connected architecture; and

A deep network architecture with convolutional layers.

The fully connected architecture is as shown in FIG. 1, having an input layer with 728 nodes, two hidden layers 7, 7' having 1024 nodes, and an output layer 9 having ten nodes.

FIG. 9 illustrates the deep network convolutional network structure. This includes a number of convolution layers 129a,b arranged to convert the 28 by 28 pixel image 3 into a 1024 dimensional feature vector. A first convolutional layer 127a is a 32 channel layer, whilst the second convolutional layer 127b is 64 channel. Each layer convolves the input with 5×5 filters (with a stride of 1 and no padding), followed by a nonlinear activation function and finally a pooling operation (with both kernel size and stride of 2).

The pooling layers are omitted from FIG. 9 for clarity. In ANNs, max-pooling is used. However, in the ONN 1 discussed, mean-pooling is used, where the activation of local nodes is average (the benchmark systems still use max-pooling).

It will be appreciated that convolutional operations are readily achievable with optics, for example using lenses. This can be achieved either directly by leveraging imaging systems or decomposing the convolution into optical matrix multiplication. This is described in the following references, which are incorporated by reference:

[40] J. Chang, V. Sitzmann, X. Dun, W. Heidrich, and G. Wetzstein, Hybrid optical-electronic convolutional neural networks with optimized diffractive optics for image classification, Sci. Rep. 8, 12324 (2018).

[41] H. Bagherian, S. Skirlo, Y. Shen, H. Meng, V. Ceperic, and M. Soljaeie, On-chip optical convolutional neural networks, arXiv:1808.03303 (2018).

[42] R. Hamerly, L. Bernstein, A. Sludds, M. Soljacic, and D. Englund, Large-scale optical neural networks based on photoelectric multiplication. Phys. Rev. X 9, 021032 (2019).

The non-linear activation function in the convolutional layers is formed by a saturable absorption material, as discussed above.

The 1024 dimensional feature vector is classified by fully connected layers 129a, 129b, 129c. The first fully connected layer 129a includes 1024 nodes, corresponding to the feature vector generated by the convolutional layers. There is a single 128 node hidden layer 129b, and an output layer 129c in which the number of nodes corresponds to the number of classes in the dataset being classified.

For the fully connected ONN 1, the MNIST data set was used. For the convolutional ONN, the more challenging Kuzushiji-MNIST (KMNIST) and Extended-MNIST (EMNIST) datasets were used (see [43] T. Clanuwat, M. Bober-Irizar, A. Kitamoto, A. Lamb, K. Yamamoto, and D. Ha, Deep learning for classical Japanese literature, arXiv:1812.01718 (2018). and [44] G. Cohen, S. Afshar, J. Tapson, and A. van Schaik, Emnist: an extension of mnist to handwritten letters, arXiv: 1702.05373 (2017) respectively) were used in addition to the MNIST data set. The KMNIST dataset contains 10 classes of handwritten Japanese cursive characters. The EMNIST Balanced dataset was used, which contains 47 classes of handwritten digits and letters. MNIST and KMNIST have 70 000 images in total, split into 60 000 training and 10 000 test instances. EMNIST has 131 600 images, with 112 800 (18 800) training (test) instances. For all datasets, the training and testing sets have all classes equally represented.

For the MNIST and KMNIST data set, the output is classified in one of ten categories representing the digits 0 and 1 to 9 (i.e. ten nodes in the output layer 129c as shown in FIG. 9). For the EMNIST data set (which includes additional characters such as letters), there are 47 categories (i.e. 47 nodes in the output layer 129c). All layers are assumed to have the same optical depth.

To obtain a comparison benchmark, ANNs with equivalent architectures were trained using standard best practices.

For ANNs the ReLU (rectified linear unit) activation function, defined as $g_{ReLu}(z)=\max(0, z)$ was used.

In the ANN, the loss function used was the categorical cross-entropy loss function. This is defined as $L=-\Sigma_i t_i \log(p_i)$ where $p_i=\exp(z_i^{(L)})/\Sigma_k \exp(z_k^{(L)})$ is the softmax probability distribution of the network output. As discussed above, the ONN 1 uses the mean squared-error loss function.

The ANN baselines for MNIST classification were also retrained using the mean squared-error loss function. The fully-connected classifier (FIG. 1) provided a classification accuracy of (98.0±0.2) %, while the convolutional classifier (FIG. 9) using ReLU nonlinearities, achieved (99.5±0.1) %. In both cases, therefore, the performance of the mean squared-error loss function is essentially equivalent to that of the categorical cross-entropy loss function.

All networks were trained with a mini-batch size of 64. The Adam optimiser with a learning rate of $5 \times 10^{-4}$ was used, independent of the optical depth of the saturable absorber. For each network, the test images of the target dataset were split evenly into a 'validation' and 'test' set. After every epoch, the performance of the network was evaluated on the held-out 'validation' images. The best ONN parameters found over training were then used to verify the performance on the 'test' set. Therefore, below, learning curves showing the performance during training are plotted with respect to the 'validation' set, with all other reported results corresponding to the 'test' set.

The fully-connected networks (e.g. FIG. 1) were trained on MNIST for 50 epochs. The convolutional networks (e.g. FIG. 9) are trained for 20 epochs when using ReLU, Tanh or Sigmoid nonlinearities, and 40 epochs when using saturable absorber nonlinearities.

Training performance was empirically observed to be sensitive to the initialisation of the weights. For low optical depths, $\alpha_0<30$, all layers were initialised as a normal distribution of width 0.1 centred around 0. For higher optical depths, the weights of the fully-connected ONN shown in FIG. 1 were initialised to a double-peaked distribution comprised of two normal distributions of width 0.15 centred at ±0.15. The weight matrices were not constrained during training because, as discussed above, conservation of energy can always be satisfied by rescaling the input power or output threshold for the first and last linear transformation and using intra-layer amplifiers in deeper architectures.

For all images, the input was rescaled to be between 0 and 1 (which practically would correspond to $0<E_{p,in}^{(0)}<1$) when passing it to an network with computational nonlinearities (i.e. ReLU, Sigmoid or Tanh). Due to absorption in networks with saturable absorber nonlinearities, it was empirically observed that rescaling the input data to higher values results in faster convergence when training convolutional networks with multiple hidden layers. Therefore, the fully connected networks (e.g. FIG. 1) used inputs between 0 and 1 and the convolutional networks (e.g. FIG. 9) used inputs normalised between 0 and 5 for $\alpha_0<10$ and 0 and 15 for $\alpha_0>10$.

Figure 8A:
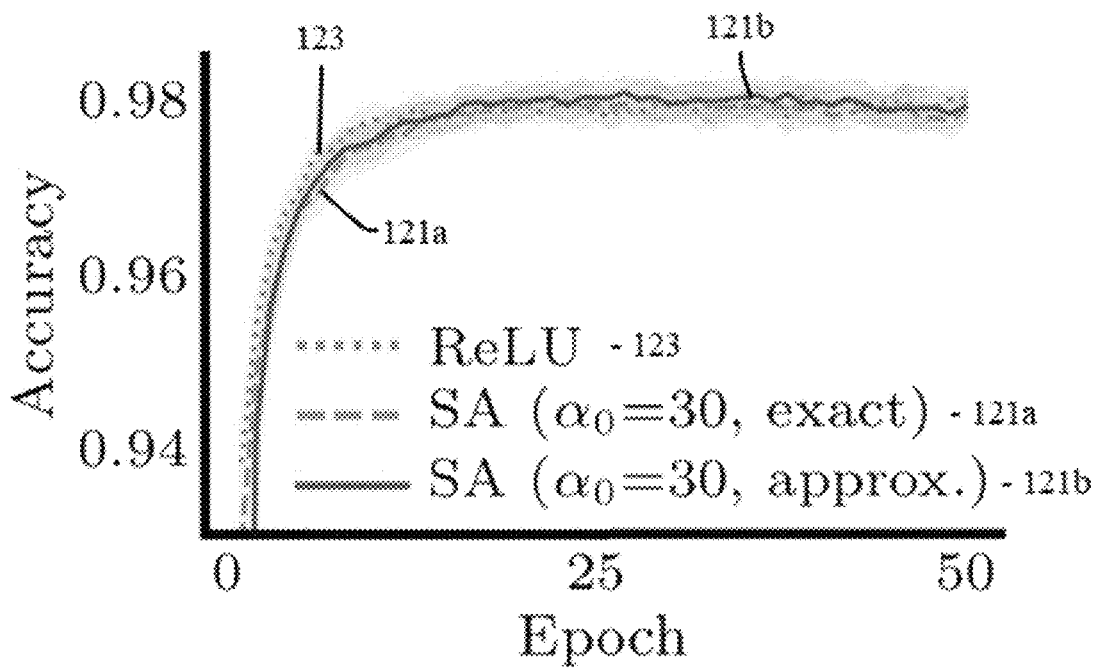
FIGS. 8A and 8B show the performance of a second example of a fully connected optical neural network, compared to benchmark system.

FIG. 8A compares the simulated performance of the fully connected ONN 1 shown in FIG. 1 (lines 121a and 121b) and a benchmark ANN (line 123). The ReLU-based classifier achieves an accuracy of (98.0±0.2) %, which provides an approximate upper bound on the achievable performance of this network architecture for the chosen task, (see [45] Y. LeCun, L. Bottou, Y. Bengio, P. Haffer, et al., Gradient-based learning applied to document recognition, Proc. IEEE 86, 2278 (1998).). An ONN 1 with an optical depth of $\alpha_0=30$ (line 121b) exactly matches this level of performance with a (98.0±0.2) % classification accuracy.

As an additional benchmark, the ONN 1 was trained with the exact derivative of the activation function (see equation 6). This obtained a similar accuracy of (98.1±0.3) %. The convergence speed to near-optimum performance during training is unchanged across all of these networks.

Figure 8B:
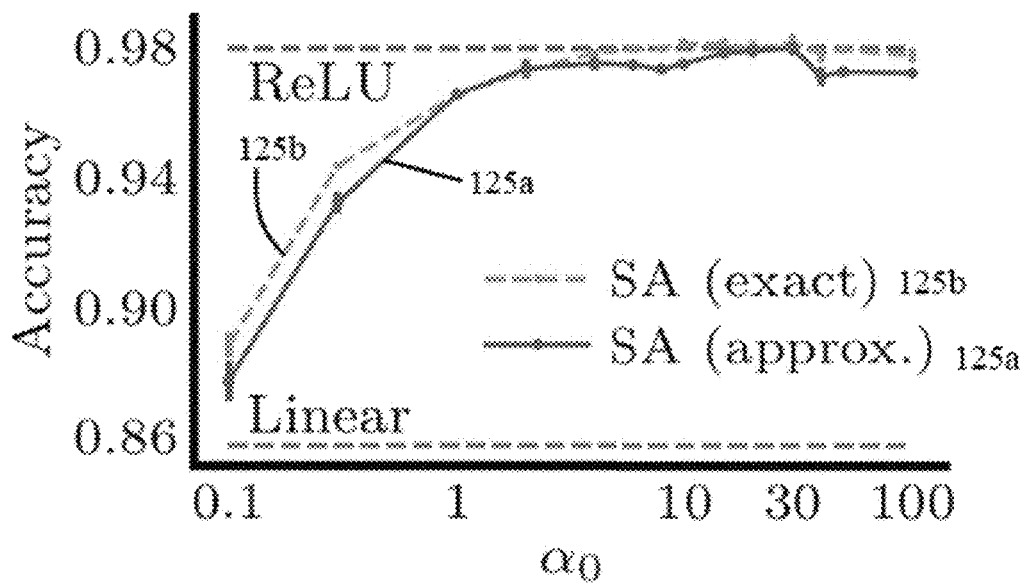

FIG. 8B shows the accuracy (lines 123a and 123b) of a trained fully connected ONN 1 (FIG. 1) as a function of the optical depth, which essentially determines the degree of nonlinearity of the transmission function. As $\alpha_0 \to 0$, the ONN 1 can only learn linear functions of the input which restricts the classification accuracy to (85.7±0.4) %. For larger optical depths the performance of the network improves towards the level shown by the benchmark systems (the horizontal dashed line). Strong performance is observed at $\alpha_0=1$ increasing to near optimal levels once $\alpha_0>10$, which is readily obtainable experimentally. Eventually, for $\alpha_0>30$, the performance of the ONN using the approximated derivative (line 125a) is reduced compared to the simulation using the exact derivate (line 125b), although high accuracy is still obtained. This can be attributed to the increasing approximation errors associated with high optical depths (see FIG. 7D), which, as previously discussed, accumulate in the deeper network architecture.

Table 1, below compares the performance for the convolution network shown in FIG. 9, with saturable absorber nonlinearities and $\alpha_0=10$ to that achieved with benchmark ANNs that use various standard activation functions.

TABLE 1

| g(·) | DATASET | | |
| --- | --- | --- | --- |
| | MNIST | KMNIST | EMNIST |
| Approximated saturable absorber | (99.3 ± 0.1)% | (95.4 ± 0.1)% | (87.9 ± 0.1)% |
| Exact saturable absorber | (99.4 ± 0.1)% | (96.3 ± 0.1)% | (88.1 ± 0.1)% |
| ReLu | (99.3 ± 0.1)% | (96.1 ± 0.1)% | (88.6 ± 0.1)% |
| Tanh | (99.2 ± 0.1)% | (95.6 ± 0.1)% | (87.5 ± 0.1)% |
| Sigmoid | (99.0 ± 0.1)% | (95.8 ± 0.1)% | (87.5 ± 0.1)% |
| Linear Class. | (92.3 ± 0.1)% | (69.6 ± 0.1)% | (87.7 ± 0.1)% |

An equivalent performance can be seen despite the approximation in backpropagation. This suggests optical backpropagation as discussed above is suitable for training sophisticated networks.

A saturable gain material may be used instead of the saturable absorber. In optical amplifiers, gain saturation takes place when a sufficiently high input power depletes the excited state of the gain medium. This process can be described similarly to saturable absorption by simply replacing the optical depth term $\alpha_0$ in equation 4 above with a positive gain factor $g_0$. The transmission (line 131), exact transmission derivative (line 133a) and optically-approximated transmission derivative (line 133b) are shown in FIG. 10A, with $g_0=3$. The derivative curves have the inverted shapes of the saturable absorber derivative curves, and resemble the sigmoid function derivative.

It will be appreciated that gain saturation nonlinearity can be used to implement optical backpropagation instead of absorption saturation nonlinearity. The saturable absorber nonlinearity in the fully connected network of example 2 (FIG. 1) was replaced with gain saturation nonlinearity. The MNIST image classification performance is shown in FIGS. 10B and 10C, using the approximated derivative. FIG. 10B shows the simulated performance for an ONN 1 with gain saturation (line 135) and the ANN ReLu benchmark (line 137). FIG. 10C shows the accuracy (line 139) as a function of $g_0$.

High accuracy can be achieved with gain factor as small as 1, and the best result scores (97.3±0.1) % at $g_0$=3, slightly lower than that of the benchmark ReLU network and saturable absorber-based ONN. Since the derivative approximation error of the gain saturation nonlinearity is the same as that of the saturable absorber nonlinearity, the performance degradation is mainly attributed to the nonlinearity itself, however, higher performance may be achievable through careful hyperparameter tuning.

It will be appreciated that in embodiments of an ONN 1 implemented with a saturable gain medium rather than a saturable absorber, the nonlinearity may be implemented by the same optical amplifiers 65 as used for inter-layer amplification. Therefore, a separate optical amplifier 65 may not be required to the medium that applies the non-linear activation function in forward operation.

The scheme is compatible with a variety of ONN platforms, implemented using different technologies. The scheme can be implemented in an ONN with any number of convoluted and fully connected layers, with any number of nodes in each layer.

In the above description, the ONN is used for classification of images of had written characters (such as numbers). However, it will be appreciated that this is by way of example only. It will be apparent to the person skilled in the art that the ONN 1 can be used for any suitable process, and the example of image analysis to identify hand written characters is for explanatory purposes only.

Source code for the simulations discussed above can be found at https://zenodo.org/record/4059672#.X6UkD3j7TOQ, the contents of which are hereby incorporated by reference.

The invention claimed is:

1. An optical neural network having at least one layer including a plurality of nodes, each node arranged to have an optical signal input thereto, the at least one layer further including: an optical transmission element arranged such that the optical signal of each node passes through the optical transmission element in both forward and backpropagation; wherein the optical transmission element comprises a saturable optical absorption material or a saturable optical gain material, having a saturation threshold-power; wherein the optical neural network is arranged such that optical signals propagating in a forward direction have a power below the saturation threshold-power at least some of the time, such that transmission of the optical signal through the optical transmission element in a forward direction is non-linear; and wherein the optical neural network is further arranged such that optical signals propagating in a backward direction have a power below a second threshold-power, lower than the saturation threshold-power, and transmission of the optical signal in a backward direction through the optical transmission element is approximately linear.

2. The optical neural network as claimed in claim 1, further including: for each node in the layer: a divider arranged to split the forward propagating signal into a detection portion and a transmission portion, after forward propagation through the optical transmission element; and a divider arranged to split the backpropagating signal into a detection portion and a transmission portion, after backpropagation through the optical transmission element.

3. The optical neural network as claimed in claim 2, comprising: for each node in the layer: a detector arranged to detect the electric field of the detection 35 portion of the forward propagating signal; and a detector arranged to detect the electric field of the detection portion of the backpropagating signal.

4. The optical neural network as claimed in claim 3, comprising a processor arranged to digitally multiply the electric filed of the detection portion of the backpropagating signals in the nodes of the layer with the electric filed of the detection portion of a forward propagating signal of nodes in a preceding layer, to determine a gradient of the loss function.

5. The optical neural network as claimed in claim 2, wherein the detection portions of the backpropagating signals in the nodes of the layer are optically interfered with the detection portion of forward propagating signals of nodes in a preceding layer, the optical neural network including detectors arranged to detect the electric field of the interfered signal to determine a gradient of the loss function.

6. The optical neural network of claim 1, comprising an optical interconnect arranged to connect the nodes of the at least one layer to nodes of a preceding layer, wherein in forward propagation, the optical interconnect provides the electric field of the optical signal of each node in the at least one layer as the weighted sum of the electric fields of the optical signals of the nodes in the preceding layer.

7. The optical neural network of claim 6, wherein the backpropagating signal is used to update the weights of the optical interconnect.

8. The optical neural network of claim 1, having two or more layers, and comprising an optical amplifier between layers.

9. The optical neural network of claim 8, wherein the amplifier forms part of an optical interconnect between layers.

10. The optical neural network of claim 1, wherein the optical transmission element comprises a saturable optical absorption material, and wherein the optical transmission element is formed by an atomic vapor cell, a cold atomic cloud in a magneto-optical trap or semiconductor materials.

11. The optical neural network of claim 1, comprising an output layer having a plurality of output nodes; for each node in the output layer, the optical neural network comprises: a feedback signal providing a target, said target being generated by training data; and a coupler arranged to interfere an output signal from the node with the feedback signal, to generate an error signal, representing a difference between the output signal and the feedback signal; and an optical guide arrangement arranged to backpropagate the error signal through the neural network.

12. The optical neural network of claim 11, comprising an attenuator or neutral density filter arranged to reduce the intensity of the error signal to below the second threshold.

13. A method of training an optical neural network having one or more layers including a plurality of nodes, each node arranged to have an optical signal input thereto, the method comprising within each layer:

forward propagating the optical signal of each node through an optical transmission element, the optical transmission element comprising a saturable optical absorption material or a saturable optical gain material having a saturation threshold-power, the forward propagated signals having a power below the saturation threshold-power at least some of the time, such that transmission of the optical signal through the optical transmission element in a forward direction is nonlinear; and backpropagating the optical signal of each node through the optical transmission element, the backpropagated signal having power below a second threshold-power, lower than the saturation threshold, and transmission of the optical signal in a backward direction through the optical transmission element is approximately linear.

14. The method of claim 13, wherein the optical neural network comprises a first layer having outputs coupled to the input of a second layer by a weighted optical interconnect, the method further comprising: determining an electric field of the forward propagating signal for each node in the first layer; determining an electric field of the backpropagating signal for each node in the second layer; and based on the electric field of the forward propagating signals in the first layer, and the backpropagating signals in the second layer, updating the weights of the weighted interconnect.

15. The method of claim 13, comprising amplifying the signal between adjacent layers in the optical neural network.

16. The method of claim, 13 wherein the optical neural network comprises an output layer having a plurality of output nodes, the method comprising, for each output node: interfering an output signal from the node with the feedback signal, to generate an error signal, said target being generated by training data; and said error signal representing a difference between the output signal and the feedback signal; and backpropagating the error signal through the neural network.

17. The method of claim 16 comprising attenuating the error signal to reduce the intensity of the error signal to below the second threshold.

* * * * *